US010681752B2

(12) United States Patent
Murray et al.

(10) Patent No.: US 10,681,752 B2
(45) Date of Patent: *Jun. 9, 2020

(54) TELECOMMUNICATION SYSTEM FOR RELAYING CELLULAR COVERAGE

(71) Applicant: VODAFONE IP LICENSING LIMITED, Newbury, Berkshire (GB)

(72) Inventors: Eric Murray, London (GB); Peter Cosimini, London (GB); Marco Angelo Pietro Del Bo, London (GB); Javier Monedero, London (GB); Tarek Elbasyouny, London (GB); Maria Vazquez, London (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/256,133

(22) Filed: Jan. 24, 2019

(65) Prior Publication Data

US 2019/0223234 A1 Jul. 18, 2019

Related U.S. Application Data

(63) Continuation of application No. 15/518,540, filed as application No. PCT/EP2015/073701 on Oct. 13, 2015, now Pat. No. 10,244,568.

(30) Foreign Application Priority Data

Oct. 13, 2014 (EP) .................................... 14382390
Dec. 5, 2014 (EP) .................................... 14382497
(Continued)

(51) Int. Cl.
*H04W 76/12* (2018.01)
*H04W 12/02* (2009.01)
(Continued)

(52) U.S. Cl.
CPC ........... *H04W 76/12* (2018.02); *H04W 12/02* (2013.01); *H04W 16/26* (2013.01); *H04W 40/22* (2013.01);
(Continued)

(58) Field of Classification Search
CPC ... H04W 16/26; H04W 40/22; H04W 76/022; H04W 76/12; H04W 88/04
See application file for complete search history.

(56) References Cited

U.S. PATENT DOCUMENTS 7,433,922 B2 10/2008 Engstrom
7,831,252 B2 11/2010 Shang et al.
(Continued)

FOREIGN PATENT DOCUMENTS

EP 1551194 7/2005
EP 1587271 10/2005
(Continued)

OTHER PUBLICATIONS

European Search Report for EP 19161930.3 dated Jun. 21, 2019.
(Continued)

*Primary Examiner* — Benjamin H Elliott, IV
(74) *Attorney, Agent, or Firm* — Workman Nydegger

(57) ABSTRACT

A cellular telecommunications network architecture is described where certain UEs are configured to assist the network to improve coverage in regions of poor radio conditions. In certain embodiments, appropriate UEs are selected to act as a dynamic, out-of-band coverage extensions. Network performance can thereby be improved when serving users at the cell edge (or in other poor radio condition regions of a cell). Data from UEs connected to those assisting UEs is encrypted to allow secure transit of data without requiring modification to the RAN or Core Network.

11 Claims, 22 Drawing Sheets

(30) Foreign Application Priority Data

| Dec. 5, 2014 | (EP) | 14382499 |
|---|---|---|
| Dec. 26, 2014 | (EP) | 14382571 |
| Dec. 26, 2014 | (EP) | 14382572 |
| Feb. 2, 2015 | (EP) | 15382031 |
| Feb. 2, 2015 | (EP) | 15382033 |
| Jun. 19, 2015 | (EP) | 15382323 |
| Jul. 30, 2015 | (EP) | 15382399 |
| Jul. 30, 2015 | (EP) | 15382400 |
| Jul. 30, 2015 | (EP) | 15382402 |
| Sep. 18, 2015 | (EP) | 15382454 |
| Sep. 18, 2015 | (EP) | 15382455 |
| Oct. 13, 2015 | (EP) | 15382495 |

(51) Int. Cl.
*H04W 16/26* (2009.01)
*H04W 40/22* (2009.01)
*H04W 84/04* (2009.01)
*H04W 88/04* (2009.01)
*H04W 88/16* (2009.01)

(52) U.S. Cl.
CPC .......... *H04W 84/047* (2013.01); *H04W 88/04* (2013.01); *H04W 88/16* (2013.01)

(56) References Cited

U.S. PATENT DOCUMENTS

| 9,344,962 | B2 | 5/2016 | Breitbach | |
|---|---|---|---|---|
| 9,432,931 | B2 | 8/2016 | Roebke | |
| 10,159,111 | B2 | 12/2018 | De Pasquale et al. | |
| 10,244,568 | B2* | 3/2019 | Murray | H04W 12/02 |
| 2006/0088004 | A1 | 4/2006 | Casey et al. | |
| 2007/0042784 | A1 | 2/2007 | Anderson | |
| 2008/0080436 | A1 | 4/2008 | Sandhu et al. | |
| 2009/0135795 | A1 | 5/2009 | Heeseon et al. | |
| 2009/0286465 | A1 | 11/2009 | Lin et al. | |
| 2010/0110968 | A1 | 5/2010 | Lee et al. | |
| 2010/0167743 | A1 | 7/2010 | Palanki et al. | |
| 2010/0195562 | A1 | 8/2010 | Ishizu et al. | |
| 2010/0317286 | A1 | 12/2010 | Jung et al. | |
| 2011/0086652 | A1 | 4/2011 | So et al. | |
| 2011/0128916 | A1 | 6/2011 | Kwon et al. | |
| 2011/0235514 | A1 | 9/2011 | Huang et al. | |
| 2011/0249609 | A1 | 10/2011 | Brusilovsky et al. | |
| 2011/0292862 | A1 | 12/2011 | Shimizu | |
| 2011/0305180 | A1* | 12/2011 | Osterling | H04W 74/006 370/311 |
| 2011/0305339 | A1 | 12/2011 | Norrman et al. | |
| 2012/0083202 | A1 | 4/2012 | Sawamoto | |
| 2012/0106404 | A1 | 5/2012 | Damnjanovic | |
| 2012/0157146 | A1 | 6/2012 | Theisen et al. | |
| 2012/0281685 | A1 | 11/2012 | Kotecha et al. | |
| 2013/0094486 | A1 | 4/2013 | Bhanage et al. | |
| 2013/0169348 | A1 | 7/2013 | Shi | |
| 2013/0201956 | A1 | 8/2013 | Cho et al. | |
| 2013/0229986 | A1* | 9/2013 | Rasanen | H04L 12/14 370/328 |
| 2013/0281021 | A1 | 10/2013 | Palin et al. | |
| 2013/0331093 | A1 | 12/2013 | Cho et al. | |
| 2013/0337872 | A1 | 12/2013 | Fertl et al. | |
| 2014/0148211 | A1 | 5/2014 | Mountford et al. | |
| 2014/0155019 | A1 | 6/2014 | Schwartz | |
| 2014/0169262 | A1 | 6/2014 | Noh et al. | |
| 2014/0169268 | A1 | 6/2014 | Hampel | |
| 2014/0220905 | A1 | 8/2014 | Buckley et al. | |
| 2014/0376426 | A1 | 12/2014 | Boudreau | |
| 2015/0117185 | A1 | 4/2015 | Kim et al. | |
| 2016/0157076 | A1 | 6/2016 | Schwartz | |
| 2016/0381725 | A1 | 12/2016 | Spinelli | |
| 2017/0205812 | A1 | 7/2017 | Clayton | |
| 2017/0238275 | A1 | 8/2017 | De Pasquale et al. | |
| 2017/0245161 | A1 | 8/2017 | De Pasquale et al. | |
| 2017/0245311 | A1 | 8/2017 | Murray et al. | |
| 2019/0223234 | A1* | 7/2019 | Murray | H04W 12/02 |

FOREIGN PATENT DOCUMENTS

| EP | 2306766 | 4/2011 |
|---|---|---|
| EP | 2442605 | 4/2012 |
| EP | 2479908 | 7/2012 |
| EP | 2496045 | 9/2012 |
| EP | 2744297 | 6/2014 |
| EP | 2763477 | 8/2014 |
| GB | 2475906 | 6/2011 |
| GB | 2503719 | 1/2014 |
| GB | 2510897 | 8/2014 |
| WO | 2003065757 | 8/2003 |
| WO | 2006138122 | 12/2006 |
| WO | 2008015562 | 2/2008 |
| WO | 2008105771 | 9/2008 |
| WO | 2008107625 | 9/2008 |
| WO | 2009097070 | 8/2009 |
| WO | 2009149023 | 12/2009 |
| WO | 2010006649 | 1/2010 |
| WO | 2010076773 | 7/2010 |
| WO | 2010151047 | 12/2010 |
| WO | 2011019976 | 2/2011 |
| WO | 2011023226 | 3/2011 |
| WO | 2011153507 | 12/2011 |
| WO | 2012015411 | 2/2012 |
| WO | 2012039656 | 3/2012 |
| WO | 2012055114 | 5/2012 |
| WO | 2013044979 | 4/2013 |
| WO | 2013130498 | 9/2013 |
| WO | 2013142361 | 9/2013 |
| WO | 2014098702 | 6/2014 |

OTHER PUBLICATIONS

"Living Document on Key Security Issues of Relay Node Architectures", 3GPP Draft; S3-100896-RN-Living-RM, 3rd Generation Partnership Project (3GPP), Mobile Competence Centre; 650, Route Des Lucioles; F-06921 Sophia-Antipolis Cedex; France, vol. SA WG3, No. Montreal; Jul. 5, 2010, Jul. 5, 2010 (Jul. 5, 2010), XP050460078, pp. 4, 6, 7, 10; figure 1.1 pp. 16, 17.

"3rd Generation Partnership Project; Technical Specification Group Radio Access Network; Evolved Universal Terrestrial Radio Access (E-UTRA); Relay architectures for E-UTRA (LTE-Advanced) (Release 9)", 3GPP Standard; 3GPP TR 36.806, 3rd Generation Project (3GPP), Mobile Competence Centre; 650, Route Des Lucioles; F-06921 Sophia-Antipolis Cedex; France, No. V9.0.0, Apr. 21, 2010 (Apr. 21, 2010), pp. 1-34, XP050402561, pp. 6,7.

U.S. Appl. No. 15/518,542, filed May 24, 2019, Final Office Action.

International Search Report and Written Opinion issued in PCT/EP2015/073353 dated Jan. 13, 2016.

European Search Report issued in EP14382390 dated Apr. 17, 2015.

International Search Report and Written Opinion issued in PCT/EP2015/073357 dated Feb. 10, 2016.

European Search Report issued in EP14382497.7 dated Feb. 9, 2016.

European Search Report issued in EP14382499.3 dated Feb. 2, 2016.

International Search Report and Written Opinion issued in PCT/EP2015/073360 dated Feb. 10, 2016.

European Search Report issued in EP15382033 dated Feb. 2, 2016.

International Search Report and Written Opinion issued in PCT/EP2015/073378 dated Feb. 10, 2016.

European Search Report issued in EP14382572 dated Feb. 2, 2016.

International Search Report and Written Opinion issued in PCT/EP2015/073376 dated Feb. 10, 2016.

European Search Report issued in EP15382031 dated Feb. 2, 2016.

International Search Report and Written Opinion issued in PCT/EP2015/073388 dated Feb. 10, 2016.

International Search Report and Written Opinion issued in PCT/EP2015/073676 dated Apr. 21, 2016.

(56) References Cited

OTHER PUBLICATIONS

Partial European Search Report issued in EP14382571 dated Feb. 9, 2016.
European Search Report issued in EP15382323 dated Feb. 2, 2016.
International Search Report and Written Opinion issued in PCT/EP2015/073391 dated Feb. 2, 2016.
International Search Report and Written Opinion issued in PCT/EP2015/073399 dated Feb. 2, 2016.
European Search Report issued in EP15382400 dated Feb. 5, 2016.
International Search Report and Written Opinion issued in PCT/EP2015/073393 dated Feb. 16, 2016.
European Search Report issued in EP15382402 dated Feb. 4, 2016.
International Search Report and Written Opinion issued in PCT/EP2015/073395 dated Feb. 16, 2016.
European Search Report issued in EP15382399 dated Feb. 2, 2016.
International Search Report and Written Opinion issued in PCT/EP2015/073397 dated Feb. 10, 2016.
International Search Report and Written Opinion issued in PCT/EP2015/073402 dated Feb. 22, 2016.
International Search Report and Written Opinion issued in PCT/EP2015/073721 dated Mar. 15, 2016.
International Search Report and Written Opinion issued in PCT/EP2015/073698 dated Feb. 26, 2016.
International Search Report and Written Opinion issued in PCT/EP2015/073680 dated Mar. 23, 2016.
International Search Report and Written Opinion issued in PCT/EP2015/073713 dated Feb. 29, 2016.
International Search Report and Written Opinion issued in PCT/EP2015/073724 dated Feb. 16, 2016.
International Search Report and Written Opinion issued in PCT/EP2015/073701 dated Mar. 9, 2016.
SA3 "Living Document on Key Security Issues of Relay Node Architectures" 3GPP Draft, Jul. 5, 2010.
"3rd Generation Partnership Project: Technical Specification Group Radio Access Network; Evolved Universal Terrestrail Radio Access (E-UTRA); Relay Architectures for E-UTRA (LTE-Advanced) (Release 9)" Apr. 21, 2010.
International Search Report and Written Opinion issued in PCT/EP2015/073725 dated Mar. 22, 2016.
International Search Report and Written Opinion issued in PCT/EP2015/073708 dated Mar. 9, 2016.
International Search Report and Written Opinion issued in PCT/EP2015/068219 dated Oct. 4, 2016.
U.S. Appl. No. 15/518,543, filed Jan. 10, 2018, Office Action.
U.S. Appl. No. 15/518,538, filed Mar. 12, 2018, Office Action.
U.S. Appl. No. 15/518,540, filed Jun. 14, 2018, Office Action.
U.S. Appl. No. 15/518,538, filed Jul. 10, 2018, Office Action.
U.S. Appl. No. 15/518,543, filed Jul. 17, 2018, Notice of Allowance.
U.S. Appl. No. 15/518,540, filed Oct. 26, 2018, Notice of Allowance.
U.S. Appl. No. 15/518,538, filed Oct. 29, 2018, Notice of Allowance.
U.S. Appl. No. 15/518,542, filed Nov. 29, 2018, Office Action.
European Exam Report for EP15777951 dated Mar. 10, 2020.

* cited by examiner

TELECOMMUNICATION SYSTEM FOR RELAYING CELLULAR COVERAGE

CROSS-REFERENCE TO RELATED APPLICATIONS

This application is a continuation of U.S. patent application Ser. No. 15/518,540 filed on Apr. 12, 2017, entitled "TELECOMMUNICATION SYSTEM FOR RELAYING CELLULAR COVERAGE," which is a U.S. Nationalization of PCT Application Number PCT/EP2015/073701, filed on Oct. 13, 2015, which claims priority to EP Patent Application No. 15382495.8 filed on Oct. 13, 2015, EP Patent Application No. 15382455.2 filed on Sep. 18, 2015, EP Patent Application No. 15382454.5 filed on Sep. 18, 2015, EP Patent Application No. 15382399.2 filed on Jul. 30, 2015, EP Patent Application No. 15382402.4 filed on Jul. 30, 2015, EP Patent Application No. 15382400.8 filed on Jul. 30, 2015, EP Patent Application No. 15382323.2 filed on Jun. 19, 2015, EP Patent Application No. 15382031.1 filed on Feb. 2, 2015, EP Patent Application No. 15382033.7 filed on Feb. 2, 2015, EP Patent Application No. 14382571.9 filed on Dec. 26, 2014, EP Patent Application No. 14382572.7 filed on Dec. 26, 2014, EP Patent Application No. 14382497.7 filed on Dec. 5, 2014, EP Patent Application No. 14382499.3 filed on Dec. 5, 2014, and EP Patent Application No. 14382390.4 filed on Oct. 13, 2014, the entireties of which are incorporated herein by reference.

FIELD OF THE DISCLOSURE

This disclosure relates to a telecommunication system. In particular the disclosure relates to a telecommunication system that provides wireless wide area communications in cellular telecommunications networks using mobile devices as mobile base stations to relay cellular signals.

BACKGROUND OF THE INVENTION

Cellular telecommunications networks characteristically provide "cells" of radio communication coverage between communication devices (which are typically mobile) and a core network (with a "downlink" from core network to communication device and an "uplink" in the opposite direction).

Various radio access technologies (RATs) are implemented: currently digital cellular networks are the most common and these are loosely classed as second generation (2G), third generation (3G), fourth generation (4G), etc. technologies according to whether the RAT achieves effective data communications that meet increasingly challenging requirements. In meeting these requirements, the technologies make different uses of the available radio frequency (RF) bandwidth: neighbouring cells in 2G technologies, for example, are deployed so that they use RF bandwidth at different frequencies to avoid interference.

To ensure effective coverage of a large geographic area, a plurality of cells are provided by respective network nodes referred to variously as base transceiver stations and base stations. Base (transceiver) stations are associated with one or more antenna arrays which in turn establish respective cells. They are controlled at least in part by other entities in the core network known as controllers (in 3G technologies such as UMTS these are referred to as radio network controllers, RNCs). More recently certain categories of base transceiver stations, referred to as eNodeBs or eNBs in the context of LTE, implement both base station functionality and at least some controller functionality. The antenna arrays (and thus, often, the base stations) are geographically distributed so that the coverage of each cell typically overlaps with that of neighbouring cells only at the cell edge. The RATs aim to ensure that communication devices are provided with continuous coverage even if they are moving from the coverage of a first cell to that of a second across the cell edge region: to do this they use a reselection technique referred to as "handover" (or "handoff"). Handoff is described as "soft" when the procedure allows for a transition period during which control and/or user data traffic intended for a given communication device is routed to the device through more than one of the cells, in other words the device is permitted to "camp" on more than one cell.

Providing communication devices with coverage at cell edge typically requires more network resources; for instance transmission power needs to be higher in the downlink in order for the RF signal to propagate to the cell edge. Release '99 of the W-CDMA Standard enabled the reuse of the same frequency at cell edge with soft handover (i.e. handover having a transition phase where a terminal effectively camps on both source and target cells).

In later releases of 3G RATs, however, HSDPA, for instance, has mainly removed in downlink the concept of soft handover: data is transmitted from only one cell to the terminal.

In many parts of the world, 4G RATs (such those compliant with the 3GPP standards known as Long Term Evolution (LTE)) are deployed. Like these later 3G releases, LTE uses universal frequency reuse (where cells sufficiently far apart operate on the same frequency) without soft handoff. Consequently, high levels of interference and low SINR (signal to interference plus noise ratio) can be expected near the cell edge. This means users at the cell edge in LTE (and HSDPA, etc.) require more radio resources (i.e. user plane resource blocks, control channel resource blocks, etc.) than users closer to the serving base transceiver stations (i.e. eNBs). Accordingly, the potential for the cell be impacted increases when there is an increase in the number and activity of users at/near to the cell edge.

LTE is also specified to handle different types of base transceiver station entities. The requirement for cellular communications coverage is far from uniform across a typical geographic area. Furthermore natural features or features of the built environment introduce additional constraints upon the operation of base station entities.

The most prevalent class of base transceiver station is the wide area eNodeB which provides coverage over a wide geographical spread (spanning distances of up to 20 km)—this is sometimes termed the "macro (layer) eNB" type. Such eNBs often provide more than one "cell" or sector.

Base transceiver stations of more limited transmit power than the macro eNBs, and typically providing one cell or sector, are referred to as micro eNBs.

Smaller cells may be provided by devices of even lower power: local area eNBs (or picocell base stations) and home eNBs (or femtocell base stations). The resulting femtocells and picocells are sometimes referred to generally as "small cells". These classes of base transceiver stations are typically used in areas where coverage would otherwise be inadequate or awkward to maintain using conventional eNB equipment. The main distinction between local area and home eNBs is that in the case of the home eNBs the location and control of the device lies with the end-user rather than the network operator; these devices conventionally offer communication services to a "white-list" of home-users rather than any network subscribers that happen to be within coverage.

LTE has a hierarchical architecture so that a wide area layer of coverage (the macro layer) may overlap or encompass geographic regions within the coverage of smaller cells (the "micro layer"). Nevertheless there may be a preference on behalf of the network operator to have uplink and/or downlink traffic for certain devices handed down to the micro layer; to free up capacity in the macro layer for devices that are out of micro layer coverage, for example.

Network operators wish to improve the efficiency of the use of their networks at or near cell edges.

It is known to address the cell edge problem by:

Increasing the performance at cell edge, for instance by adding more and more complex software in the macrocells to improve the cell edge performance (usually within the area of the coordinated scheduling between adjacent cells). In certain cases, such as for the CoMP (Coordinated Multi Point) feature described in 3GPP Release 11, the improved cell edge performance brings with it the need for dedicated transmit (Tx) and receive (Rx) antennas associated with one or more macro eNBs.

Installing fixed Small Cells (i.e. local area eNodeBs) to increase system capacity.

The installation of fixed small cells by a network operator brings with it the burden of finding suitable locations, paying for the site rental, and deploying additional cables to connect the fixed Small Cells to other nodes of the network. Furthermore, installation and commissioning (including configuring) of fixed small cells takes time: even if wireless backhaul is used instead of cables, the fixed small cells need to be installed in a suitable position and configured for operation at that location. In some cases, this process may include the configuration and testing of directional antennas associated with such small cell devices which require the skills of a professional radio engineer. In addition, where the small cell device fails or otherwise requires servicing the device and the installation site needs to be accessible by the operator: since these devices are typically the property of the network operator but located on private land and in sometimes inaccessible locations, there are likely to be logistical and practical obstacles to intervention by one of the operator's engineers.

The LTE standards (Release 10 (and later) of the 3GPP) also describe two further Radio Access Network entities: relays and repeaters which can be used to address the problem of cell edges. Both types of entity provide extension of coverage for one cell of an existing base transceiver station.

A repeater is communicatively tied to a corresponding (typically macro) eNB, having a first antenna within a given cell (the "donor cell") of the eNB and a second antenna directed towards a coverage area where coverage extension is required. In certain instances, a repeater merely retransmits (i.e. re-broadcasts) a signal, received at a first frequency, at a second frequency, typically amplifying the repeated signal. Uplink and downlink signals may thus be conveyed through repeaters without any need for decoding.

Repeaters specified in Release 10 (and later) of the 3GPP standards decode the (incoming) signal and then recode and retransmit that signal: this new class of repeater is referred to as a "relay".

A relay is also communicatively tied to a corresponding eNB. It too has a first antenna within a given cell (the "donor cell") of the eNB and a second antenna directed towards a target coverage area. Relays however form their own cells and operate in many ways as base transceiver stations in their own right. Relays decode the signals from the donor cell, applying any necessary error correction, and make decisions about how radio resources (such as the channels within each radio subframe) are assigned.

There are certain network conditions where individual communication devices in cellular networks have a disproportionately detrimental effect on the network performance.

In certain cases, for example, one or more terminals (also termed "user equipment" or simply UE) may be close to the edge of a serving cell. A small number of active users at cell edge can consume a high number of cell resources (e.g. LTE resource blocks) since cell edge typically correlates to poor coverage; implying that a higher number of resources must be dedicated to the cell edge users to provide a throughput at a given level when compared to the demand for resources by users that are in better radio conditions (i.e. away from the cell edges). Serving radio resources to communication devices at cell-edge has a higher cost in terms of resource allocation and power usage than a similar device in a region of the cell closer to a serving base transceiver station system (such as an eNodeB).

When cellular networks are deployed, they are often specified with greater capacity than is forecast to be required by the existing communication devices. However, the numbers of communication devices and the demand for ever more network resources means that the network may be affected by capacity problems in the radio interface more often than is acceptable.

Known approaches to cell edge problems seek to increase the capacity or coverage of the cellular network by addition of further network equipment at locations in the network where cell edge problems regularly occur (or are forecast). Such equipment is typically fixed in location and requires careful planning.

Network and other performance conditions very often change over time: for instance, individual communication devices that, by virtue of their location at the cell edge and active use of the network, have a detrimental effect on the network performance at one time, may, at other times, be idle and cause no such effect. Furthermore, as UEs are typically mobile, they may have moved outside the affected cell entirely or closer to the base transceiver station equipment that serves the cell—either way, reducing the detrimental effect.

Although the LTE standards define the concept of a UE acting as a relay, implementing such a system within the LTE core network may be difficult. The 3GPP standards require the LTE RAN to be modified to support devices acting as relays, which is undesirable for network operators. Network operators may therefore choose not to implement the system, thereby preventing UEs from acting as relays when connecting to those RANs. There is therefore a need for a system to allow implementation of relays without requiring modifications to a RAN.

It is therefore desirable to ensure that the network can adapt to the presence of dynamic effects upon capacity and coverage and in addition to provide a system that allows the extension of coverage in a cellular network that can be deployed dynamically without requiring the siting of additional radio equipment near regions of poor radio coverage.

SUMMARY OF THE INVENTION

According to a first aspect of present disclosure there is provided a cellular communication device configured to provide an aggregator function, the cellular communication device comprising a radio system for establishing a wireless connection to a cellular radio area network; a base station radio system configured to act as a base station for establishing cellular wireless connections with one or more other cellular communication devices; and a security function configured to establish a secure connection with a cellular core network, via a cellular radio area network to which the radio system has established a wireless connection; wherein the secure connection is utilised to carry data from and to the base station radio system.

The radio system and the base station radio system may operate according to the same cellular standard.

The cellular standard may be LTE.

The secure connection may be established to a security gateway of the cellular core network.

The secure connection may be utilised to carry S1 communication links between the base station radio system and the cellular core network.

According to a second aspect of present disclosure there is provided a communications network for providing cellular communications to mobile devices, the network comprising, a cellular macro radio area network; a cellular core network connected to the macro radio area network, a cellular communication device comprising a radio system having a cellular wireless connection to the macro radio area network; a base station radio system configured to act as a base station for establishing cellular wireless connections with one or more other cellular communication devices; a security function having a secure connection with the cellular core network via the cellular wireless connection to the cellular macro radio area network; wherein the secure connection is utilised to carry data from and to the base station radio system.

The secure connection may be established to an aggregator security gateway of the cellular core network.

The secure connection may be carried, at least in part, by a further secure connection between a base station of the macro radio area network and a macro security gateway of the core network, and via a macro security gateway of the cellular core network and an APN of the cellular core network used only by devices providing aggregator functions.

The security function may utilise the IPSec security protocol.

According to a third aspect of present disclosure there is provided a method of communication between an aggregator device and a cellular core network, the method comprising the steps of establishing a cellular connection from a base station radio subsystem of the aggregator device to a mobile device, wherein the aggregator device acts as a base station in the connection; establishing a cellular connection from the aggregator device to a base station of a macro cellular radio area network; and establishing a secure connection between the aggregator and the cellular core network via the macro cellular radio area network, wherein the secure connection is utilised to carry data from and to the base station radio subsystem of the aggregator device.

The secure connection may be established to an aggregator security gateway of the core network.

The secure connection may be carried, at least in part, by a further secure connection between a base station of the macro radio area network and a macro security gateway of the core network and via a macro security gateway of the cellular core network and an APN of the cellular core network used only by devices providing aggregator functions.

The secure connection from the aggregator to the cellular core network may be established using the IPSec protocol.

The secure connection may be utilised to carry S1 communication links between the base station radio subsystem of the aggregator device and the cellular core network.

The secure connection may enable direct addressing of the base station radio subsystem of the aggregator device from the cellular core network.

In addition, the above aspects may be implemented within a controller entity for controlling an aggregator facility in a cellular telecommunication network, wherein the network has a core network, CN, and a radio access network, RAN, and serves at least one first communication device, the controller entity comprising a network interface unit configured to provide an interface to the CN and controller unit configured: to obtain performance condition information for a region of the telecommunication network, to determine whether a second communication device provides aggregator functionality to said at least one first communication device, and to instruct the second communication device to establish an aggregation connection to the first communication device in dependence upon the determination.

In certain embodiments, the performance conditions include conditions associated with a communication link between the or each first communication device and an eNB in the RAN, and the controller unit is configured to determine whether a second communication device provides aggregator functionality by determining whether the performance conditions match trigger conditions.

In certain embodiments, the controller unit is configured to instruct the second communication device to establish an aggregation connection by assigning a second communication device to operate in the aggregator mode, upon receipt of an indication that performance conditions match the trigger conditions, and commanding the first communication device to switch at least a portion of its data link from the eNB to the second communication device in aggregator mode, wherein aggregator mode is a mode in which the second communication device is configured to aggregate data traffic from one or more of said first communication devices.

In certain embodiments, the performance conditions include conditions related to the location of one or more second communication device and the controller unit is further configured to obtain performance condition information repeatedly at time intervals and to determine whether a second communication device provides aggregator functionality on successive occasions in dependence upon the performance condition information thus obtained, thereby updating the determination. In certain embodiments, the conditions related to the location of one or more second communication device indicate whether each second communication device is static for a duration sufficient to allow effective aggregator functionality.

In certain embodiments, the controller unit is configured to activate the network interface unit in dependence upon the performance condition information, thereby activating an aggregator layer in the telecommunication network. In certain embodiments, the processing means is configured to deactivate the network interface unit in dependence upon the performance condition information, thereby deactivating an aggregator layer in the telecommunication network.

In certain embodiments, the performance condition information includes location information for the at least one first communication device and the controller unit is further configured to determine whether a second communication device provides aggregator functionality in dependence upon the location information for the at least one first communication device.

In certain embodiments, the controller entity corresponds to the aggregator controller in the system described above and may implement any of the functionalities of the aggregator controller in the system described above.

In addition, the above aspects may be implemented in conjunction with a method in a controller entity for determining functionality of communication devices in a cellular communication network including a plurality of communication devices, the method comprising: obtaining at least one measure of the performance of the cellular communication network in a component area of radio coverage; determining from the or each measure of performance whether performance conditions in the component area of radio coverage support the activation of an aggregator facility, said aggregator facility providing radio coverage to at least one first communication device within a selected geographical area; determining from the or each measure of performance whether a net benefit is expected for the performance of the network in the component area as a result of the activation of the aggregator facility; and controlling activation of an aggregator functionality at at least one second communication device when performance conditions in the component area of radio coverage support the activation of the aggregator facility and when a net benefit is expected.

As a result, it can be determined whether an aggregator facility (i.e. an aggregator layer), in which the radio coverage offered by the macrocell is extended by the addition of radio coverage from one or more aggregators, can and should (according to some criteria) be initiated. Each second communication device that becomes an aggregator has a functionality whereby that device may provide radio coverage in addition to that of the macrocell. This aggregator functionality may be activated as a routine within a client application executing on the communication device or as a dedicated functionality, for example.

In certain cases, determining whether a net benefit is expected as a result of the activation of the aggregator facility may include determining whether the number of static first communication devices located in a portion of the component area within range of the at least one second communication device exceeds a threshold number.

In certain cases, determining whether performance conditions support the activation of an aggregator facility includes determining whether network conditions necessary for the activation of an aggregator facility hold for a given component area of radio coverage; and determining whether network conditions sufficient to support the activation of an aggregator facility hold for the component area.

In certain cases, determining whether the network conditions necessary for the activation of an aggregator facility hold includes at least one of: determining whether cell load exceeds a load threshold while throughput lies below a minimum throughput threshold; determining whether the number of users in a region of the cell exceeds a user number threshold while throughput for a given application falls below a minimum throughput threshold; determining whether a happiness metric lies below a happiness threshold; and/or determining whether the usage of control resources exceeds a control resource threshold.

In certain cases, the network conditions sufficient for the activation of an aggregator facility depend upon the level of at least one of the following parameters: the number of communication devices in the component area of radio coverage; the number of communication devices in the component area of radio coverage having activated aggregator functionality; signal to interference plus noise ratio, SINR; path loss/received signal received power, RSRP; the available radio access technologies, operational frequency bands and/or carriers; location information of the communication devices; mobility information of the communication devices; and predicted device power profile for the at least one communication devices.

In certain cases, the at least one second communication device is one of: a user equipment (UE); a machine type communication (MTC) device; a repeater; a relay unit; an access point; wireless station; small cell station; or a dedicated aggregator facility communication device.

In certain cases, determining whether a net benefit as a result of the activation of the aggregator facility is performed on a macrocell basis for at least one macrocell within the cellular telecommunications network.

In addition, the above aspects may be implemented in conjunction with a method in a controller entity for determining functionality of communication devices in a cellular communication network including a plurality of communication devices, the plurality of communication devices including one or more candidate aggregator devices, the method comprising: obtaining information relative to candidate aggregator devices in a given area of radio coverage; for each of a plurality of subsets of the candidate aggregator devices, estimating a corresponding expected gain based on the obtained information, wherein the expected gain is a difference between an estimated value of a first measure of performance of the network after activation of an aggregator functionality in said subset of candidate aggregator devices and a first measured value of the first measure of performance of the network before activation of an aggregator functionality in any of the plurality of subsets, and wherein the aggregator functionality provides radio coverage to at least one first communication device within a selected geographical area; and activating an aggregator functionality in at least one subset selected from the plurality of subsets based at least in part on their corresponding expected gains.

Examples of the techniques used to obtain the estimated value of the first measure of performance of the network include: estimation by temporary activation of the aggregator functionality (whether complete or partial activation of the aggregator functionality is performed); and estimation which requires no activation of the aggregator functionality (for example using a modelling or inference technique to interpolate or extrapolate from known historical or other related indirect measurements).

In certain cases, the method may further comprise: maintaining the aggregator functionality activated in the at least one selected subset if a second measured value of the first measure of performance of the network after activation of the aggregator functionality in the at least one selected subset is higher than said first measured value.

It is noted that one or more of the subsets of the candidate aggregator devices could have a single candidate aggregator device as a member. Often, however, there are likely to be a plurality of such candidate aggregator devices in each subset considered.

In certain cases the method may further comprise: choosing a selection algorithm for use in selecting the at least one subset based on a type of the obtained information.

As a result, the aggregator selection algorithm used may be chosen to suit the available type of information relative to candidate aggregator devices in the given area of radio coverage obtained.

In certain cases, the expected gain for each subset is estimated by: obtaining the first measured value by measuring said first measure of performance of the network before activation of an aggregator functionality in any of the plurality of subsets; and for each candidate aggregator device in the subset, calculating the estimated value of the first measure of performance of the network for a case where the device provides an active aggregator functionality, and calculating a difference between the estimated value and the first measured value of the first measure.

Alternatively, the expected gain for each subset is estimated by, obtaining the first measured value by measuring said first measure of performance of the network before activation of an aggregator functionality in any of the plurality of subsets; and for each subset, calculating the estimated value of the first measure of performance of the network for a case where each of the devices in the subset provides an active aggregator functionality, and calculating a difference between the estimated value and the first measured value of the first measure.

In certain cases, the subset in which the aggregator functionality is activated is selected by: evaluating the expected gain for each subset; and selecting a subset having a required expected gain. Here, the evaluation of the expected gain may comprise calculating which of the at least one subsets provides the greatest expected gain, and wherein the selection of the subset having the required expected gain comprises selecting the subset that provides the greatest expected gain.

Alternatively, the evaluation of the expected gain may comprise calculating which of the subsets requires fewest changes in aggregator devices from the aggregator devices currently providing the aggregator functionality, and wherein the selection of the subset having the required expected gain comprises selecting the subset that requires fewest changes in aggregator devices, the estimated expected gain exceeding a threshold gain value.

In a further case, the evaluation of the estimated expected gain may comprise modelling performance of the network with the selected subset activated and comparing that modelled performance information to the measured performance of the network before activation of an aggregator functionality.

In certain cases, if the second measured value of the first measure of performance of the network does not exceed the first measured value, the method may further include: controlling the or each candidate aggregator device having an active aggregator functionality to deactivate the aggregator functionality.

In certain cases, activating the aggregator functionality in the at least one selected subset may include, for the or each candidate aggregator device in the selected subset, controlling the respective device to activate the active aggregator functionality.

In certain cases, the method may further comprise obtaining a third measured value of a second measure of performance of the network before activation of an aggregator functionality in any of the plurality of subsets; and maintaining the aggregator functionality activated in the at least one selected subset if a fourth measured value of the second measure of performance of the network after activation of the aggregator functionality in the at least one selected subset is higher than the third measured value.

In such cases, the second measure of performance used in determining whether to maintain an already active aggregator functionality may thus differ from the first measure used to determine whether the aggregator functionality should be activated in the first instance.

In certain cases, the method may further comprise updating the selection of candidate aggregator devices, at spaced-apart intervals of time, by: obtaining a further measured value of the measure of performance of the network; for each subset of the candidate aggregator devices, estimating an updated corresponding expected gain; selecting at least one of the subsets based at least in part upon their corresponding updated expected gain; activating an aggregator functionality in each selected subset; and maintaining the active aggregator functionality if the further measured value of the measure of performance of the network exceeds a reference value of said measure. Here the method may further comprise, before estimating the updated expected gain, changing the configuration of the active aggregator functionality in response to the further performance information.

In certain cases, the reference value may be a value of said measure averaged over a plurality of historical measurements. Alternatively, the reference measured value may be a value of said measure selected from any one of N further measured values of said measure obtained in the N most recent update operations.

In certain cases, each candidate aggregator device may be a communication device that fulfils at least one criterion selected from: sufficient battery life; location within a portion of the given area of radio coverage for which the aggregator functionality is expected to be required; and current path loss metric for the communication link between the communication device and the cellular communication network falls below a path loss threshold.

Examples of communication device may include one of a user equipment (UE); a machine type communication (MTC) device; an access point; wireless station; and/or small cell station.

In respective cases, the given area of radio coverage may be selected from: a macrocell coverage area for at least one macrocell within the cellular telecommunications network; a coverage area for at least one sector within the macrolayer of the cellular telecommunications network; and the coverage area of the entire cellular telecommunications network.

The above aspects may also be implemented in conjunction with a method for determining functionality of communication devices in a cellular communication network including a plurality of communication devices, the plurality of communication devices including one or more candidate aggregator devices, the method comprising, at spaced-apart intervals of time: estimating an expected gain for each of a plurality of subsets of the candidate aggregator devices, the estimate being based on information relative to candidate aggregator devices in a given area of radio coverage, wherein the expected gain is a difference between an estimated value of a measure of performance of the network after activation of an aggregator functionality in said subset of candidate aggregator devices and a current measured value of the measure of performance of the network, and wherein the aggregator functionality provides radio coverage to at least one first communication device within a selected geographical area; activating an aggregator functionality in at least one subset selected from the plurality of subsets based at least in part on their corresponding expected gains; and maintaining the activated aggregator functionality in the at least one selected subset if the current value of the measure of performance of the network exceeds a reference value of said measure.

The above aspects may be implemented in conjunction with a communication device for providing an aggregator facility in a telecommunications network having a core network, CN, and a radio access network, RAN, the communication device comprising: a communication unit configured to establish an aggregation connection to at least one nearby communication device and to establish a second connection between the at least one nearby communication device and the CN, and a processor unit configured to report device status information to an aggregator controller, to receive instructions from the aggregator controller, said instructions being dependent upon performance conditions including the reported device status, and to enable the aggregation connection in accordance with the instructions.

In certain embodiments, the processor is configured to report device status information including information selected from: the location of the communication device, accuracy of the location, supported RAT technologies, supported RAT frequency bands, battery characteristics, mobility state, and/or current battery drain consumption.

In certain embodiments, the processor is configured to enable the aggregation connection by establishing an aggregation cell at a frequency band different from an operating frequency band of the RAN.

In certain embodiments, the processor is configured to enable the aggregation connection by establishing an aggregation cell using a wireless communication technology different from a wireless communication technology used by the RAN.

In certain embodiments, the processor unit is further configured to enable the second connection by enabling the communication unit, the second connection including the aggregation connection and a wireless connection between the communication device and the RAN.

Certain embodiments of the aggregation cell serve more than one nearby communication device. In these embodiments, the wireless connection aggregates a data traffic for each of the nearby communication devices into an aggregated payload, thereby making more effective use of the wireless connection.

In certain embodiments, the communication device for providing an aggregator facility corresponds to the second communication device in the system described above and may implement any of the functionalities of the equivalent second communication device in the system described above.

The above aspects may also be implemented in conjunction with a method for reporting readiness of a communication device to act as aggregator in a telecommunications network having at least one controller entity, the method comprising: determining a change in location of the communication device based on two or more locations determined at temporally spaced apart intervals, the interval being a first interval; if there has been no change in location over the first interval, further comparing locations at a second interval; and if there has been no change in location over the second interval, determining that the communication device is in an aggregator-ready status and reporting the location of said aggregator-ready device. Conveniently changes in location may be determined in the communication device itself.

In certain cases, the location of the communication device is an absolute location. Conveniently, the location of the communication device may be determined using a global navigation satellite system, GNSS, such as GPS. The location of the communication device may be reported in GPS format.

In certain cases, the second interval may be set in accordance with the type of the communication device.

In certain cases, the method may further comprise determining that the communication device is not in an aggregator-ready status if there has been a change in location over the first interval; and reporting the location to the controller entity. The method may then further comprise determining location of the communication device after a third temporally spaced apart interval.

In certain cases, the method may further comprise, if there has been no change in location over the second interval, determining the location of the communication device at temporally spaced apart intervals, the interval being a fourth predetermined interval.

In certain cases, reporting the location of the aggregator-ready device may comprise reporting the location to the controller entity. Alternatively or additionally, reporting the location of the aggregator-ready device may further comprise reporting aggregator-ready status to the controller entity.

In certain cases, the method may further comprise obtaining additional information concerning the status of the communication device; and reporting the additional information to the controller entity. The additional information may conveniently include an indication of the remaining battery life of the communication device.

The above aspects may also be implemented in conjunction with a method for handling change in mobility status of a communication device that provides an active aggregator cell in a telecommunications network, the telecommunications network having a core network, at least one controller entity and a macrolayer radio access network, the macrolayer radio access network being configured to provide a backhaul connection to the core network and to provide wireless communication connections to communication devices, the method comprising: at temporally spaced apart intervals, obtaining a plurality of locations of the communication device; comparing a location determined at an earlier time to a location at a later time; if there has been no change in location, instructing communication devices having active connection to reconnect to the macrolayer, and causing the cell to bar establishment of further active connections.

In certain cases, this method may further comprise reporting that the aggregator cell is deactivated as a result of the change of mobility status.

In addition, the above aspects may be implemented in conjunction with a method for providing a coverage map within a telecommunication network, said telecommunication network comprising a plurality of communication devices including first communication devices and second communication devices and a controller entity, the method comprising: activating one or more second communication devices to broadcast beacon signals at one or more specific radio frequency, RF, bands, wherein the beacon signals enable one or more first communication devices to make measurements; receiving at the controller entity, measurements from the one or more first communication devices, said measurements being based on the beacon signals received at said one or more first communication devices; and creating, using the measurements, by the controller entity, a coverage map, wherein the coverage map is indicative of the coverage that the second communication devices can provide for the first communication devices.

The second communication devices are different from the first communication devices in regards of their capacity to act as aggregators, where an "aggregator" is a device comprising means for aggregating one or more connections from first communication devices towards a RAN and/or core network. In the context of the present disclosure, aggregating is to be understood as the capacity to provide a coverage area to provide service to a number of first communication devices currently connecting through an additional cellular communications layer. An aggregation connection transports aggregated data from first communication devices, the data from each first communication device being packetized for backhaul to a core network.

In general, and specifically in such cases, the controller entity may be configured to activate second communication devices to broadcast beacon signals. The second communication devices are instructed to send a beacon signal. Herein, the term beacon signal includes for example pilot signals, reference signals as well as other types of beacon signal.

The first communication devices may then receive a command to scan and listen to frequency bands upon which the beacon signals are broadcast and to report, to the controller entity, measurements of the broadcast signal received from the or each second communication devices (i.e. potential aggregator). The measurements may relate to the measured received power the broadcast signal at the respective first communication devices.

The first communication devices then provide reports of the measurements of the beacon signal back to the controller entity, which then uses these reports to build maps of coverage (e.g. pathloss maps) for the second communication devices. The transmission power of the beacon signal may advantageously be known at the controller entity.

In certain cases, the method may be used to decide which second communication devices are best to use for providing service to other communication devices.

In certain cases, specific information may be gathered on radio conditions in order to take decisions on which aggregators may be activated. Given the specific features and conditions of a network of second communication devices acting as small cell or access points that are dynamically activated the method provides a way for the first communication devices or terminals whose data is to be aggregated to measure the quality of the coverage they could get from an aggregator before the aggregator has come to service. The mentioned radio conditions may include availability, battery life, location, expected benefit, etc.

In certain cases, the second communication devices are communication devices that are configurable to act as aggregators, and the controller entity is an aggregator central controller. Advantageously this allows the controller entity to instruct the second communication devices to establish an aggregation connection to the first communication device and a second connection between the first communication device and a core network CN, wherein the second connection includes the aggregation connection and the instruction is dependent upon performance conditions.

In certain cases, the controller entity instructs said one or more second communication devices to activate.

In the context of this aspect of the disclosure, a map of coverage may be a record of the discovered relationships between potential aggregators and population of first communication devices or UEs. If the geographical locations of both the potential aggregator and the UEs are known, then the map can be a geographical map whereby the relationship between the potential aggregators and UEs is distance. However, when the geographical location of the UE is unknown with any precision, then the map can be a radio map, where the relationship between the potential aggregator and the UEs is pathloss, received signal strength or equivalent measure. Multiple relationships may be recorded by a map of coverage if known. For example, both distance and pathloss may be discovered and recorded. This information may be displayed graphically (as if it were a conventional map), and/or the relationships may be recorded only in a machine readable database. There may be information in the map of coverage including the time in which potential aggregators and potential aggregated devices are static or the time in which they have been in the cell, or even data such as remaining battery life.

In certain cases, the activation of one or more second communication devices is performed periodically. Advantageously beacon signals may be sent periodically by the second communication devices to one or more first communication devices allowing the update of radio conditions of the telecommunication network at the controller entity. This is quite advantageous in situations where the first communication devices, for example mobile phones, change position continuously.

Alternatively, instead of periodically, the activation may be made upon a command received from the controller entity. Advantageously the controller entity may be in communication with a core network from which estimations may be received so that a decision is made to activate said beacon signals in the second communication devices.

In certain cases, the one or more radio frequency bands are non-cellular bands close to the cellular bands to be used in the RAN.

Measurements are advantageously made on the non-cellular band but in a band which is representative of measurements that would have been made if a cellular band had been used. Here the term "representative" means that said non-cellular band exhibits similar propagation features to the propagation features of those cellular bands, such as fading, reflection or diffraction, in such a manner that the pathloss behaviour reported by the communication devices reliably reproduces the pathloss for cellular bands to be used in the RAN. Thus, instead of making a measure directly into a cellular band, which may be done only using cellular communications, e.g., for regulatory reasons, the non-cellular band is used to make a measurement as a proxy for said cellular band, and the non-cellular band used is one that is close to the cellular band in such a way that all radio measurements (such as power received, attenuation, interference, etc.) can be considered as equivalent to measurements that would have been done in the cellular band.

In this manner, the created map is a more reliable pattern for pathloss and at the same time the cellular bands are not burdened with the need to transport said transmissions, meaning that they are suitable for use for other purposes, such as communication.

In certain cases the one or more RF bands may be cellular bands to be used in the RAN. In certain embodiments there may be FDD or TDD channels which are not used within cellular the RF band which may be used for broadcasting the beacon signals.

In cases where the one or more RF bands are cellular bands, the one or more second communication devices may be activated to broadcast said beacon signals in a barred state.

In cases when cellular RF bands are used for the broadcast of beacon signals, a second communication device may be put in a barred state so that it does not appear as an available access point/cell to the first communication device receiving a broadcast signal. This advantageously allows a controller entity to receive measurements from said first communication device.

It is also contemplated that the second communication devices may broadcast beacon signals without the requirement of acting as aggregators: i.e. simply due to conditions such as remaining battery life or bandwidth requirements from the second communication device in a particular time frame, or others. Advantageously, in these cases, the beacon signal's carrier is a carrier not carrying traffic, so this is a way to ensure it only acts as a beacon carrier as it is prevented from managing data or voice traffic. In case a second communication device is selected (i.e. activated) to act as an aggregator, one cellular carrier used will be a first carrier, whilst a second carrier would be used as beacon only. Alternatively in the same area a single carrier may be used as both:

beacon only, when the aggregator is not aggregating but just signalling its presence, or traffic and beacon when the aggregator is actually managing aggregated traffic.

The beacon signal may thus be sent via a cellular technology, such as LTE FDD, TDD, or 3G, or a non-cellular wireless technology, using a Wi-Fi carrier in the 2 GHz spectrum, for example.

In certain cases, the method may further comprise activating one or more of the second communication devices as an aggregator based on at least the coverage map.

Further to creating a map of coverage, the controller entity may activate one or more second communication devices depending on the requirements for a permissible pathloss, for example. In an example a map of coverage may fulfil the requirements for a group of devices so that the potential aggregators offering a required service may be activated. In another example, further to the map of coverage, the controller entity may activate some of the potential aggregators only if other conditions are met.

In certain cases, the activated one or more second communication devices are second communication devices which are not currently acting as aggregators. Advantageously this allows rotation of second communication devices acting as aggregators.

Additionally or alternatively, the second communication devices may comprise second communication devices which are already acting as aggregators. Advantageously this allows the whole set of second communication devices to be considered as aggregators, thus capturing both groups of second communication devices to be mapped:

only aggregators which are to be switched on, so that they are considered as candidate aggregators and potentially selected, and also those aggregators which are already active.

In certain cases, the telecommunication network may further comprise a core network (CN) and a radio access network (RAN), wherein the first communication devices are communication devices connected to the CN via the RAN, and which are candidate to be connected to the CN via the second communication devices.

In this way, handover is avoided for first communication devices being aggregated through a particular aggregator in the case when, for example, a second communication device is selected as a potential aggregator; in said example even if the potential aggregator is to be activated, the aggregator keeps its function as second communication device which is to be an aggregator and thus the first communication device needs not to be handed over to a different aggregator layer.

In certain cases, creating the map of coverage comprises estimating, for each of the first communication devices, a pathloss with each relevant second communication device.

The map of coverage is created for the aggregators not yet active (i.e., those candidate second communication devices that are yet to be activated) and also for those that are already active.

A "relevant" second communication device may be a device whose connection path with the first communication device is to be included in the map of coverage. For example, the pathloss may be only computed between those first communication devices and aggregators to which there is at least a possibility of connection. In another example, the pathloss may be computed between each and every pair of aggregators and first communication devices.

In certain cases, the estimated pathloss is based on the measurements reported by the one or more first communication devices which have received the relevant beacon signal.

The above aspects may be implemented within a system for providing an aggregator facility in a telecommunications network; the system comprising: a core network, CN; and a radio access network, RAN, which is configured to provide a backhaul connection to the CN and to provide wireless communication connections to radio communication devices; wherein the system further comprises: a first communication device, the first communication device having a first connection to the CN, the first connection path including a wireless connection between the RAN and the first communication device; a second communication device; and an aggregator controller, which communicates with the RAN and the CN and which is configured to instruct the second communication device to establish an aggregation connection to the first communication device and a second connection between the first communication device and the CN, wherein the second connection included the aggregation connection and the instruction is dependent upon performance conditions.

The second connection may be used instead of the first connection to the CN; alternatively the second connection may be used in addition to the first connection to the CN.

In certain embodiments, the aggregation connection is a wireless connection.

In certain embodiments there are a plurality of first communication devices. Where there are more than one first communication device, the aggregation connection transports aggregated data from the first communication devices, the data from each first communication device being packetized for backhaul to the core network.

In certain embodiments, the second communication device may be a user equipment (UE) whose user has indicated that the UE may be dynamically assigned to act as an "aggregator".

In certain embodiments, the second connection further includes a second wireless connection to the RAN and the backhaul connection from the RAN to the CN. Where the second communication device is a user equipment (UE), the second wireless connection may be established using a SIM card specific to that device to authenticate the device to the CN.

In certain alternative embodiments, the second connection further includes a connection using at least one connection technology selected from: optical fibre cable technologies; Ethernet technologies; a fixed line xDSL technology; microwave backhaul technology; and/or a Wi-Fi technology. In the case of Wi-Fi technology, the connection may thus comprise a Wi-Fi section from second communication device to a Wi-Fi access point and a fixed line section from the Wi-Fi access point to the core network. Fixed line xDSL and optical fibre connections may be either direct or indirect; in the indirect case, the connection may be established via at least one intervening network entity.

In certain embodiments, the second communication device may be a dedicated communication device specifically deployed to act as an aggregator. Alternatively or additionally, the second communication device may be a small cell base transceiver station, for example, a home eNodeB (HeNB).

In certain embodiments, the aggregator controller is independent of the RAN. The controlling functionality (which could be implemented, for example, as a software) is thus placed in an entity that is typically external to the eNodeBs. This external entity is configured to establish a communication channel with selected terminals (or other communication devices) that are capable of acting as aggregators for other terminals in the network. When each of these selected terminals acts as aggregators for one or more other terminals in the network, the latter are connected to the CN via a secondary connection which is different from the primary connection they would have when connected with the CN via the RAN. These connections are primarily logical connections between the terminals and the CN. The secondary connection will include a communication channel between the selected terminal and the one or more other terminals in the network for which the selected terminal acts as an aggregator (hereafter, we will call the selected terminal "aggregator"). The aggregator will communicate with each of these other terminals and combine their communication streams before they are transmitted to the Core Network. In certain cases, the external entity is configured to establish further parallel communication channels with other communication devices: this may be useful when determining the locations of communication devices more generally rather than candidate aggregators alone, as may be needed in certain embodiments.

As a result, the system may be deployed without requiring bespoke adaptations of otherwise conventional eNodeBs to include dedicated software functionalities. The introduction of a separate controller entity means that the system may be implemented in association with any conventional macrocell layer deployment.

Furthermore the system requires neither changes in network architecture nor new stricter requirements in synchronization, backhaul, etc.

As a user may obtain (and to some extent control the positioning of) candidate aggregators, the users of the network may also benefit in that they are able to influence the overall coverage of the macrolayer by their own actions. In some instances, an aggregator placed close to a window (whether outdoors or indoors), can provide improved coverage indoors to UEs, giving a better link budget.

The use of such aggregator facility systems may have an advantage for legacy communication devices since they would gain access to potentially more up-to-date equipment in the deployed aggregator controller, thereby improving performance of such low-tier terminals in connecting to the macrolayer through the aggregator.

Location services may also benefit from the availability and/or presence of aggregator devices as each aggregator may be used as a further means to discover the positions of respective communication devices, thereby improving location accuracy.

In certain embodiments, the performance conditions upon which the instruction to the second communication device to establish the second connection depends include a metric of coverage quality and/or usage of resources in the network being greater than a threshold level. This metric may be a metric of a level of interference in the network. In particular, this level of interference may be one due to the use of the first connection. The threshold level is an estimate (which can be predetermined) of a level of interference due to the use of the second connection.

In certain embodiments, the instruction to establish an aggregation connection may be conditional upon performance conditions associated with the second communication device. This may be in addition to the metric discussed above. The performance conditions associated with the second communication device may include parameters associated with the connection between the second communication device and the RAN. The performance conditions associated with the second communication device may include at least one of SINR, received signal received power (RSRP), location information, and battery life.

In certain embodiments, the aggregator controller may be further configured to process the performance conditions associated with the second communication device and, only if the parameters are determined to indicate that the second communication device is a candidate for assignment as an aggregator, to instruct the second communication device to establish the aggregation connection to the first communication device.

There is further provided computer software operable, when executed on a computing device, to cause one or more processors to perform a computer implemented method according to the above aspects of the present disclosure.

A further aspect provides machine-readable storage storing such a program.

Various respective aspects and features of the present disclosure are defined in the appended claims.

It is an aim of certain embodiments of the present disclosure to solve, mitigate or obviate, at least partly, at least one of the problems and/or disadvantages associated with the prior art. Certain embodiments aim to provide at least one of the advantages described below.

BRIEF DESCRIPTION OF THE DRAWINGS

Various embodiments of the present disclosure will now be described with reference to the accompanying drawings, in which.

DETAILED DESCRIPTION OF THE PREFERRED EMBODIMENTS

The present disclosure relates to secure transport of UE data in a telecommunications network architecture that includes a radio access network (RAN), a core network (CN) and a packet data network (PDN). Communication devices, such as mobile terminals, user equipment (UEs) and wireless access stations, establish wireless connections to the network by means of the RAN.

Figure 1A:
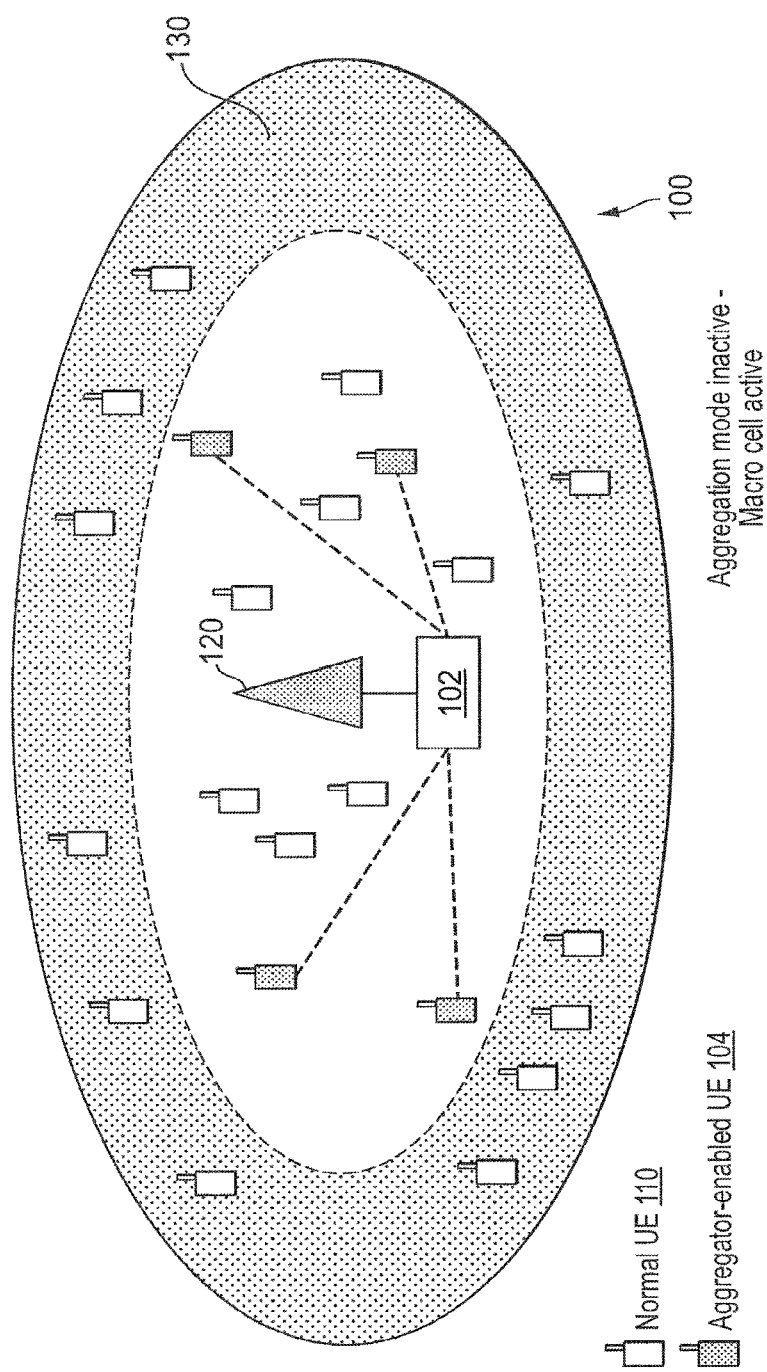
FIGS. 1A to 1C illustrate a radio access network where certain communication devices are dynamically assigned as aggregators within a single cell.
Figure 1B:
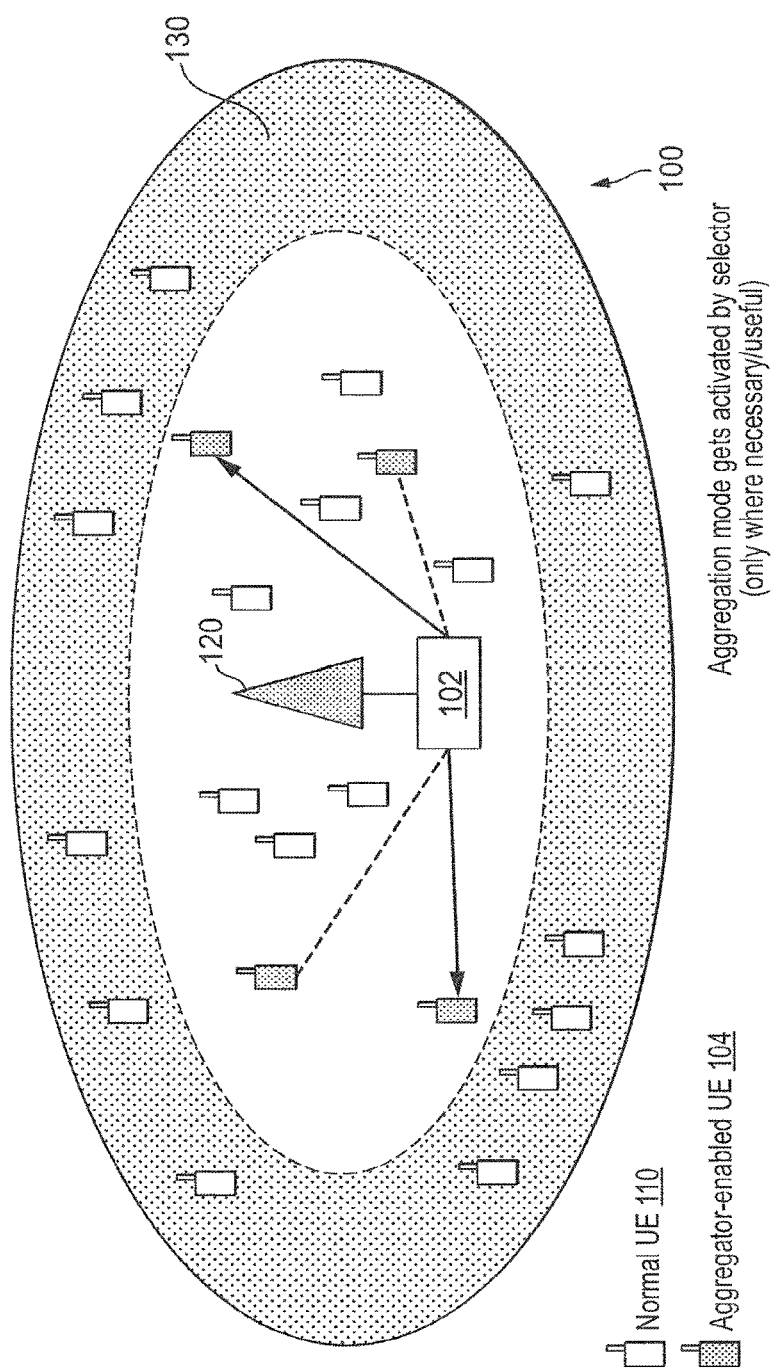
Figure 1C:
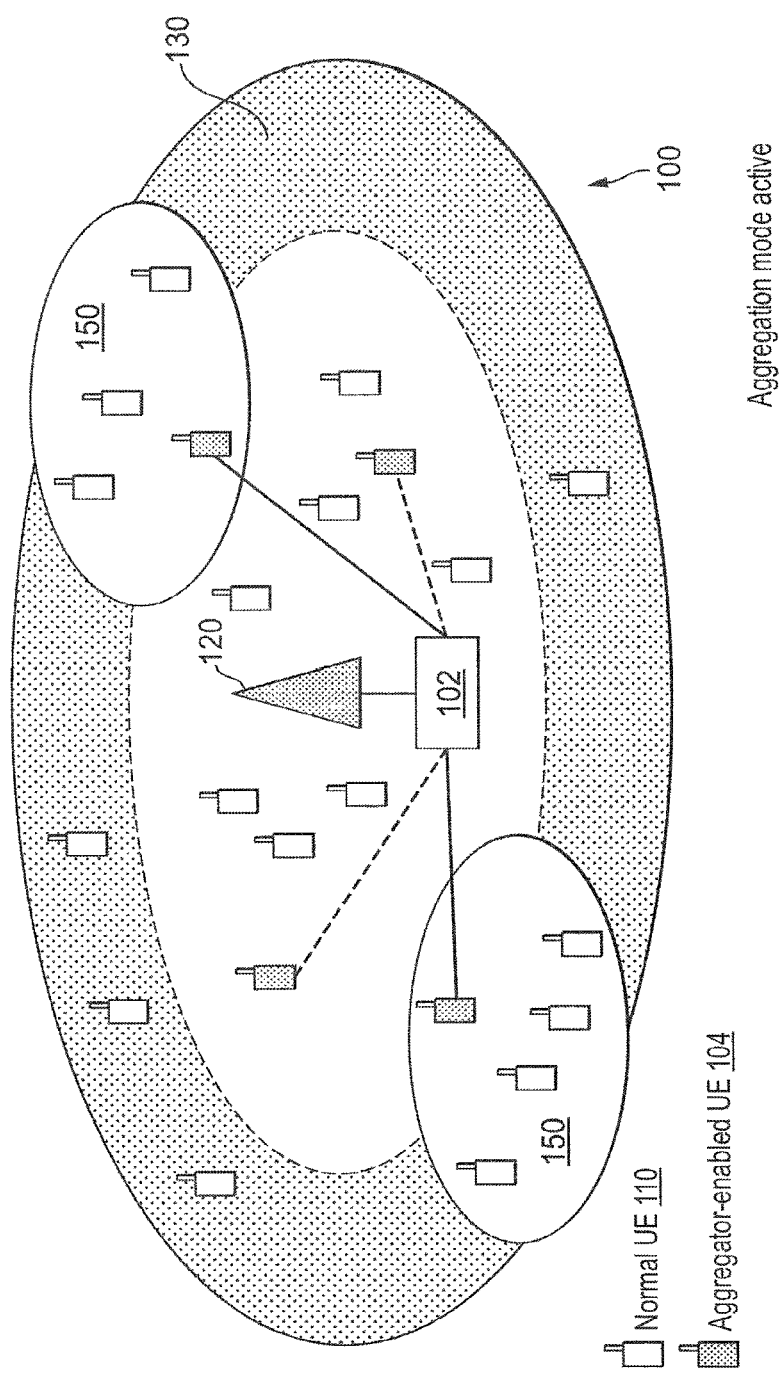

FIGS. 1A to 1C show a single cell 100 of the telecommunications network provided by a base transceiver station (i.e. macro eNB) 120 within the RAN. The telecommunications network architecture further comprises a network node, referred to as an aggregator controller (AC) 102, which communicates with the RAN and the CN (illustrated here as a link between the AC 102 and the eNB 120) but which may be implemented independently of the component entities of either RAN or CN.

The AC 102 identifies at least one communication device 104 as candidate for assignment as an aggregator. The AC 102 also instructs any given aggregator candidate 104 to activate (or deactivate) an aggregator mode, whereby it provides base station functionality for nearby (mobile) communication devices 110: in FIG. 1C, each activated, aggregator-enabled communication device 104 provides a respective aggregator cell 150. The AC 102 also determines whether any aggregator candidate 104 is activated at all at a given time in a given region of the telecommunications network. In FIGS. 1A to 1C, candidate aggregators 104 are illustrated as UEs: this is merely one example of a suitable communication devices 104, candidate aggregators may equally be dedicated communication devices or even small cell base transceiver stations such as HeNBs or femtocell eNBs.

The AC 102 is configured to interrogate one or more communication devices 104, where these devices are connected to the RAN (i.e. the eNB 120), to determine certain parameters associated with the device 104 and/or its connection to the RAN (e.g. SINR, reference signal received power (RSRP), receive signal code power (RSCP), location information, battery life, etc.). Data associated with the parameters is processed at the AC 102 and, if the parameters are determined to indicate that the or each communication device 104 is a candidate for assignment as an aggregator, the communication device 104 may be configured to implement an aggregator mode, whereby it provides base station functionality for nearby (mobile) communication devices 110.

FIGS. 1A to 1C also illustrate one scenario where the facility extending base station functionality to nearby (mobile) communication devices 110 is contemplated. As communication devices approach the furthest range of macrocell coverage in the cell (i.e. the cell edge, illustrated as shaded area 130), they consume more network resource. By selecting certain communication devices to act as aggregators, these devices being within good macrocell coverage but having the facility to extend base station functionality within an "aggregator cell" beyond the coverage of the macrocell layer, the network can deploy aggregators to address the problems of cell edge.

Certain network-connected communication devices 104 are thus used as a type of small cell entity. Network-connected communication devices assigned to perform this small cell-like functionality are termed "aggregators" because, where there are more than one communication devices 110 nearby a given network-connected communication device 104 in aggregator mode, the data traffic from the nearby communication devices 110, for each of the nearby communication devices 110, is buffered for transport (i.e. "aggregated") using a backhaul connection between the aggregator 104 and the core network. By aggregating the data from one or more nearby communication devices 110, the aggregator can both (a) assist in extending the network coverage to locations where (i) the macrolayer coverage is otherwise either temporarily or permanently inadequate or (ii) the macrolayer coverage is adequate but devices within a certain coverage area (e.g., cell edge) consume too many resources and (b) transport data over the RAN more efficiently. One of the advantages of buffering data from the nearby communication devices 110 is that the backhaul connection from the aggregator 104 (which may be considered as a single logical "pipe") can be made less "bursty" reducing signal resource consumption and reducing the overhead of the signalling.

Aggregators are typically, dynamically switched-on and off in dependence upon conditions affecting the performance of the network. These performance conditions include both network conditions (such as interference, load, etc.) and other conditions that could affect the performance of the system (such as the predicted level of activity in the cell at a given time or date, the presence and/or number of candidate aggregators in suitable locations, the distribution of UEs in cell edge locations, and/or the level of resource consumption by communication devices in the potential coverage area of respective candidate aggregators).

In certain cases, the coverage of the existing macrolayer is used for backhaul and a technology/band different from the one used for the backhaul is used as a radio interface for extending the coverage to nearby (mobile) communication devices 110. The coverage extension is therefore supplied to nearby communication devices 110 by aggregators operating "out-of-band" with respect to the macrolayer operating frequencies.

In one example, the macrolayer operates using LTE carriers at frequency bands around 800 MHz or 1800 MHz while the cell 150 provided by the aggregator to nearby communication devices operates at 2600 MHz. In another example, the macrolayer operates using LTE carriers at frequency bands around 2600 MHz using an FDD technology while the cell extension provided by the aggregator to nearby communication devices operates at 2600 MHz in a TDD technology. Furthermore, the reader will appreciate that further out-of-band frequency bands may be available at frequencies for which no licence is needed, such as the 2.4 GHz and 5 GHz bands used by conventional WiFi technologies (i.e. compliant with the IEEE 802.11 family of standards) or in the near infrared and visible light spectrum used by light communications technologies such as visible light communications, VLC (sometimes referred to as "Li-Fi").

Aggregators (and candidate aggregators) may be fixed in a single location much as conventional small cell base station transceivers are: determining or obtain a location for such devices is essentially a matter of checking that this fixed status has not been altered. Equally and without loss of generalisation, it will be appreciated that in many instances aggregators (and candidate aggregators) are themselves mobile. While in certain embodiments, it is a requirement that the aggregator is static when active, it is also contemplated that the aggregator may be moved to another site and activated at the new site—such communication devices are referred to as "nomadic", as distinct from "fixed" devices. One specific example of a nomadic device arises when the candidate aggregator is installed in a motor vehicle, such as a commuter's car: the vehicle is driven from a home location (where it may be static) to an office location (where, after the journey is complete, the device may again be unmoved throughout the working day).

The AC 102 is a central logical entity (e.g. a server), which may or may not be integrated within the elements of the 3GPP Radio Access Network. The AC 102 monitors conditions affecting the performance of the network to assist in deciding which UEs 104 (or other network-connected communication devices) will act as aggregator.

Certain implementations of the AC 102 obtain information from all network-connected communication devices in a given sector before determining which of these devices can act as aggregators by virtue of the device status and current location. This determination is repeated for respective sectors at intervals of time: in certain cases, the intervals are equal in duration, while in others, the intervals are of variable duration and may be adapted to the known or predicted behaviour of communication devices using the network.

The AC may further repeatedly determine whether, on a set of basic criteria (i.e. performance conditions such as the network conditions, the current location and status of communication devices, etc.), any devices in a given sector should enter into service as aggregators at all. The criteria may include a measure of the comparative benefit of introducing an aggregator facility compared to having no aggregator facility in a given sector.

The AC is capable of establishing, maintaining and deactivating communications with the candidate aggregators, i.e. those UEs or other network-connected communication devices determined to have the capability to act as aggregators. This capability (provided through an application layer carried over the user plane of the macro layer, for example) allows the AC to:

obtain information from all the UEs that can act as aggregators 104, this information may include performance factors such as location and its accuracy, supported RATs and related technologies (such as conventional WiFi technologies, VLC technologies, etc.), supported operational frequency bands, battery characteristics, status, and current battery drain consumption; and/or provide commands to the aggregators 104 such as: commands to set-up an aggregator control layer using some specific algorithm depending upon performance conditions such as those obtained from the aggregators 104, to select the RAT/band to be used in such a layer, to start transmission, to send handover commands to the aggregated UEs (i.e. the nearby communication devices 110 served by the aggregators 104), to stop transmission, and/or to send information to the aggregator control layer.

In certain implementations, the AC 102 might communicate with the LTE eNodeB or 3G RNC in order to "move", via handover to a specific RAT/frequency, a terminal (or other communication device) that is set to act as an aggregator 104. This move may be a change in serving cells: in such cases the communication with the LTE eNodeB or RNC is a request for a handover of the aggregator 104 from a current cell to a neighbouring cell: communication with the eNodeB or RNC is necessary then since handovers are under the control of the LTE eNodeB (for 3G, the control is done by the RNC). The move might also be a forced reselection: in which case communication with the LTE eNodeB would be unnecessary.

In certain implementations, the AC 102 may establish a further direct communication with "normal" UEs 110 (i.e. those communication devices not currently assigned to act as aggregators). This direct communication may be through a preinstalled application, for instance, configured to gather further performance information such as the strength/quality of received signals in the cell 100 in which the normal UEs 110 are camped/connected, and/or data on the strength/quality of received signals in other RATs/band, and/or location information.

In certain implementations, the aggregation enabled communication devices 104 (i.e. aggregators or candidate devices) are also relay nodes. Such devices may transfer data for one group of network-attached communication devices as a conventional relay node, while serving another group of network-attached communication devices as an aggregator.

The aggregator 104 is distinct from a typical relay node in a number of respects. Firstly, relay nodes are tied to a particular donor cell. They are presumed to be static and entirely under the control of the network operator via the eNB providing the donor cell. Furthermore, relay nodes are typically operated using radio resources allocated to them by the donor cell and are thus integrated in the scheduling for the macrocell. In logical terms, a connection from a communication device to the core network via a relay node is the same logical connection as that between the communication device and the core network via the donor eNB: resource that would be allocated within the macrolayer for the direct connection from communication device to eNodeB is instead allocated to the indirect connection via the relay unit.

The macrolayer (i.e. provided by eNB 120) and the aggregator 104 provide separate logical connections between the Core Network and communication device 110, with the aggregator 104 being "configurable" to provide this connection. Whereas the relay node provides an alternative physical route provided the communication device camps on the relay cell rather than the donor cell, the AC 102 ensures that the network can control whether a given candidate (or group of candidates) for aggregator is enabled (i.e. enters into service as an aggregator) and thus determines the conditions under which the communication device switches between a connection established by the RAN and a connection established by the aggregator (when instantiated).

Figure 2A:
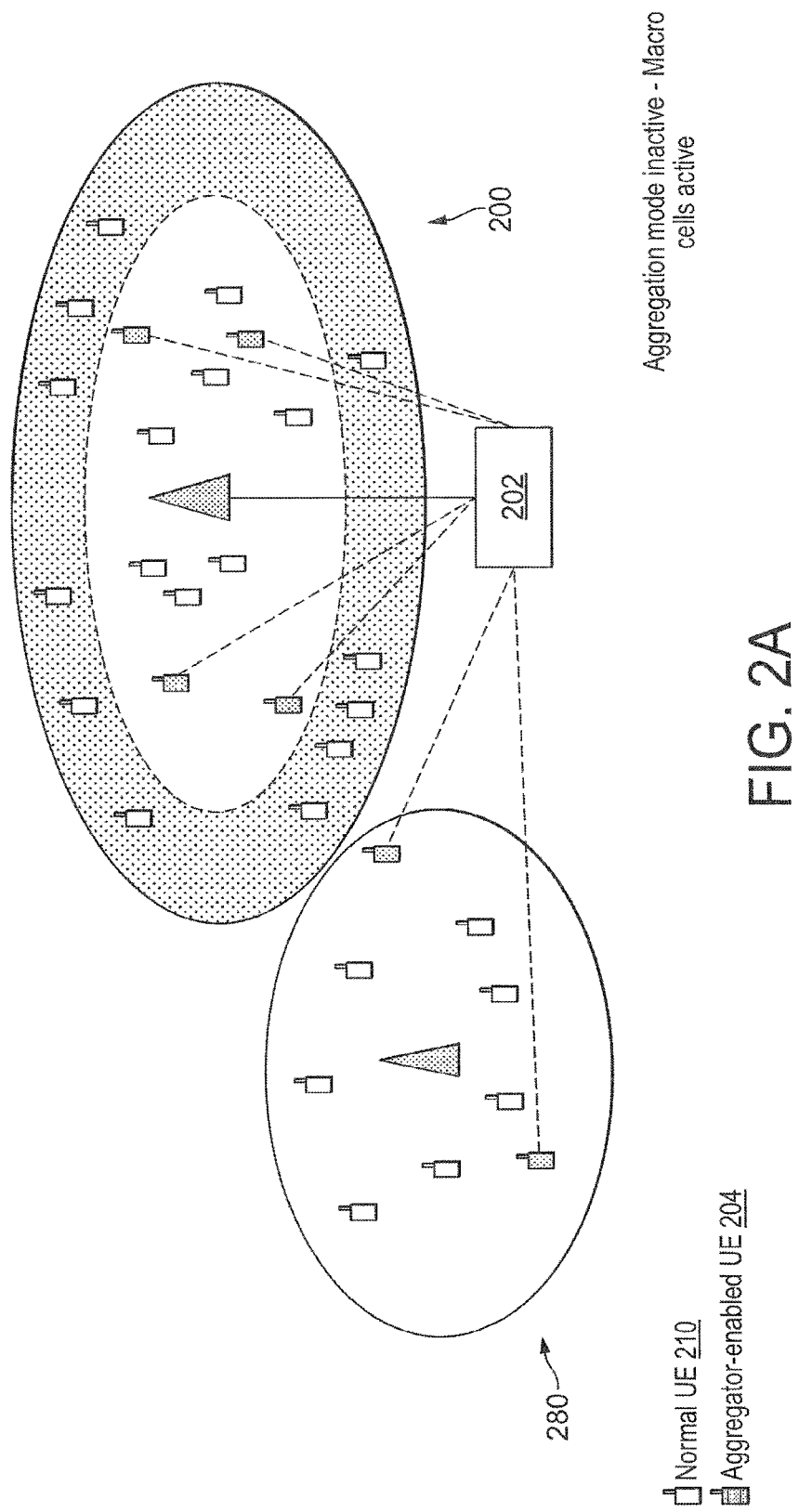
FIGS. 2A and 2B illustrate a further radio access network where certain communication devices are dynamically assigned as aggregators within a multicell network.
Figure 2B:
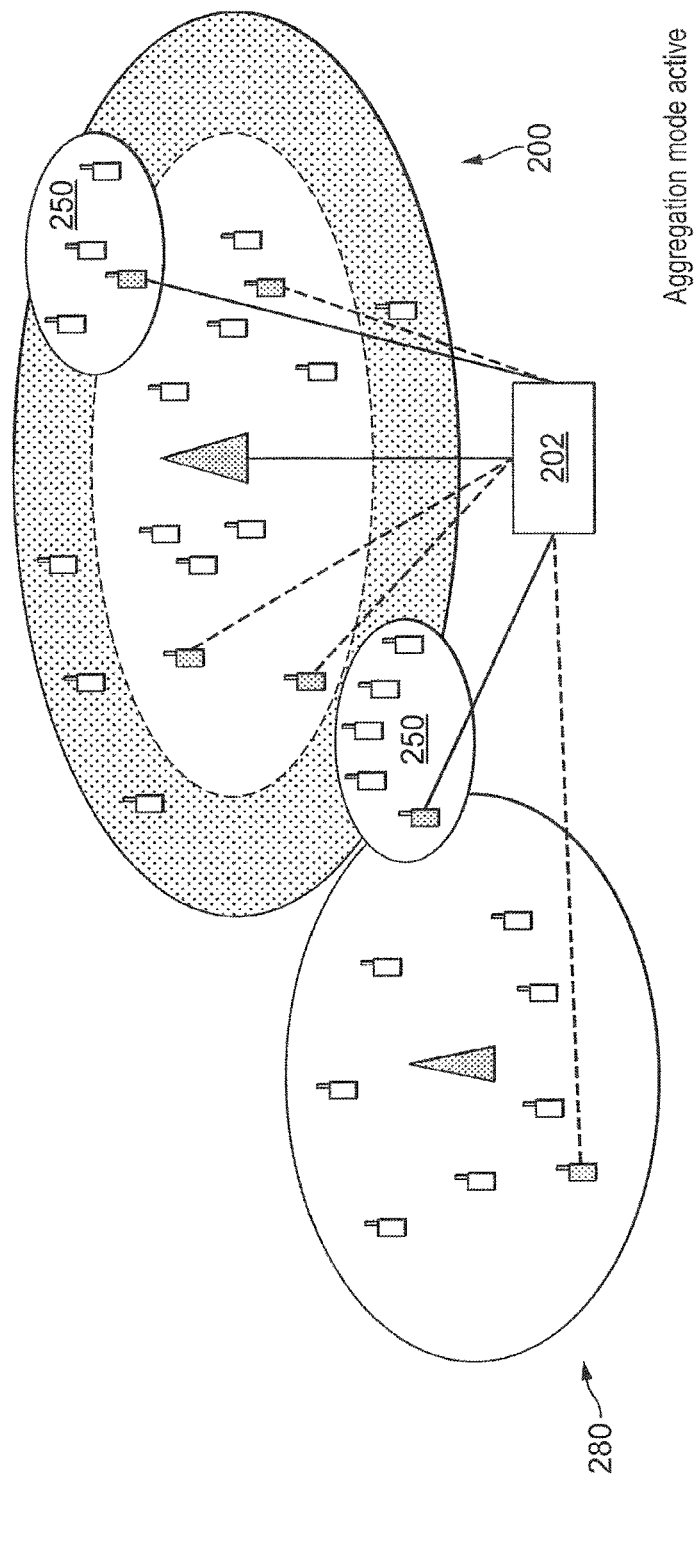

FIGS. 2A and 2B illustrate a further radio access network where certain communication devices are dynamically assigned as aggregators within a multicell network. This scenario demonstrates that the aggregator is not however merely a "temporary" base transceiver station. As the aggregator is activated and deactivated ad hoc (i.e. opportunistically) based on the need of the RAN as a whole, it is contemplated that certain communication devices 204 camped on neighbouring cells 280 could be assigned aggregator status: in FIG. 2B, each activated, aggregator-enabled communication device 204 provides a respective aggregator cell 250.

Such aggregators 204 can be arranged to provide more effective base station functionality to communication devices in the cell 200 currently serving a conventional communication device 210. While that aggregator 204 would normally be outside the reach of the serving cell 200, it can nevertheless be activated, via the AC 202.

As the AC 202 need not be associated specifically with a given cell 200, but rather with a network that may include a plurality of cells (200, 280), the AC 202 is adapted to view the network holistically. By activating aggregator facilities 204 that sit outside the (macrolayer) coverage of a cell 200 yet still serving communication devices 210 within that cell 200, the AC 202 may still deliver an overall benefit to the network.

Figure 3:
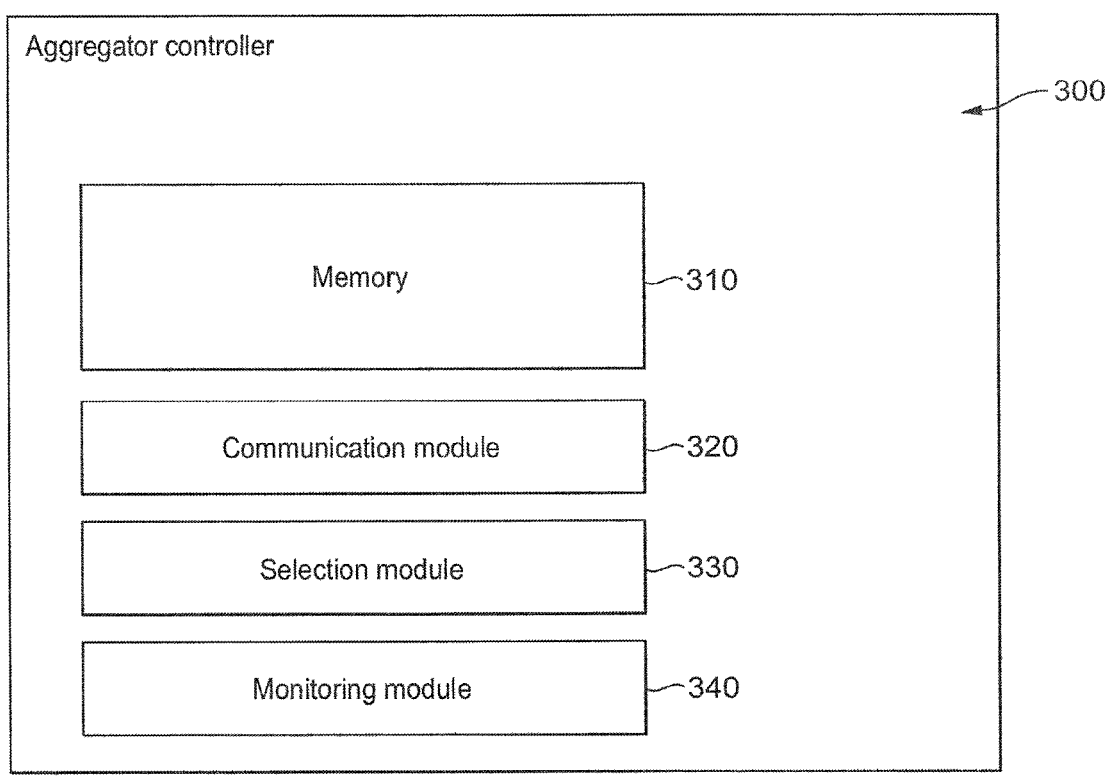
FIG. 3 illustrates the functional elements of an aggregator controller suitable for enabling, controlling and disabling an aggregator layer in the network architecture of FIGS. 1A, 1B, 1C, 2A and 2B.

FIG. 3 illustrates the functional elements of an aggregator controller 300 suitable for enabling, controlling and disabling an aggregator layer in the network architecture of FIG. 1A, 1B, 1C, 2A or 2B. These functional elements may be implemented as software routines and/or as dedicated hardware units, these elements being substantially interchangeable.

The functional elements include a communication module 320 for obtaining information from potential aggregators by establishing communication via an application layer with these devices. The information obtained contributes to the factors affecting the performance of the network upon which the establishment of a connection between aggregators and nearby communication devices depends and may include: current location (e.g. location information derived from global or regional satellite positioning systems, such as Global Positioning System, GPS, GLONASS, BeiDou/COMPASS, IRNSS or Galileo)); historical information (covering, for example, the last two weeks) of the location of the candidate aggregator; level of physical mobility at present (i.e. whether moving or not); a measure of LTE radio coverage in the macrolayer; an indicator of battery level, current consumption, expected remaining battery etc.; information concerning neighbour cells of the aggregator, in respect of the connection between the aggregator and the macrolayer RAN; and a measure of the improvements (or otherwise) expected, after switching on an aggregator layer in a specific region of the radio network, the improvements being measured in terms of latency (i.e. data waiting time), for example. This information may be made available in the application layer through an aggregator client application executing on the respective aggregator candidate devices.

One reason for obtaining such information relates to the nature of the devices that are candidates. It is likely that many of the candidate aggregators are in fact "nomadic", changing (i.e. commuting) between two or more static locations over a period of hours or days. Thus for many candidate devices the characteristics of the network will change as they move within the network: a communication device that is a suitable candidate aggregator at a given location, X, and a given time, T, may not be suitable elsewhere, X+x, at a later instant, T+t: specifically if the location is close enough to extend an aggregator cell to the (macrolayer) cell edge at T, but out of range of the cell edge at T+t. Thus the controller 300 needs to obtain this information to inform decisions as to whether the communication device is (currently) a candidate aggregator and whether, if a candidate aggregator, it should be activated/deactivated as an aggregator.

Optionally, the communication module 320 may be configured to obtain additional information from communication devices other than aggregators; this additional information being analogous to the information obtained from candidate aggregators and similarly contributing to the factors affecting the performance of the network upon which the establishment of a connection between aggregators and nearby communication devices depends. A specific non-aggregator client application may be installed in some or all of the communication devices within a network to provide this additional information.

The communication module 320 may also be configured to obtain macrolayer information (i.e. data concerning network conditions) from the macrolayer concerning the current level of resource consumption of the schedulers, coverage maps and (if available) real time traffic maps.

The functional elements include a selection module 330 for selecting (and communicating to) the aggregators that have to start the transmission of an aggregator cell and for determining which of the supported technology/frequency bands the selected aggregators is to use in operation.

A monitoring module 340 is also provided to evaluate performance conditions (such as the network conditions and other conditions affecting performance) to determine which of the currently selected aggregators will continue their transmission.

In cases where a change in aggregator is indicated by the monitoring module 340, the selection module 330 may be further configured to select (and communicate to) those aggregators which should stop their transmission (and thereby cease to be in service as an aggregator).

When enabling an aggregator layer in a given sector or cell of a radio network, the aggregator controller first instructs one or more communication devices (preselected to act as aggregators) to start radiating coverage (i.e. to implement an aggregator "cell").

Figure 4:
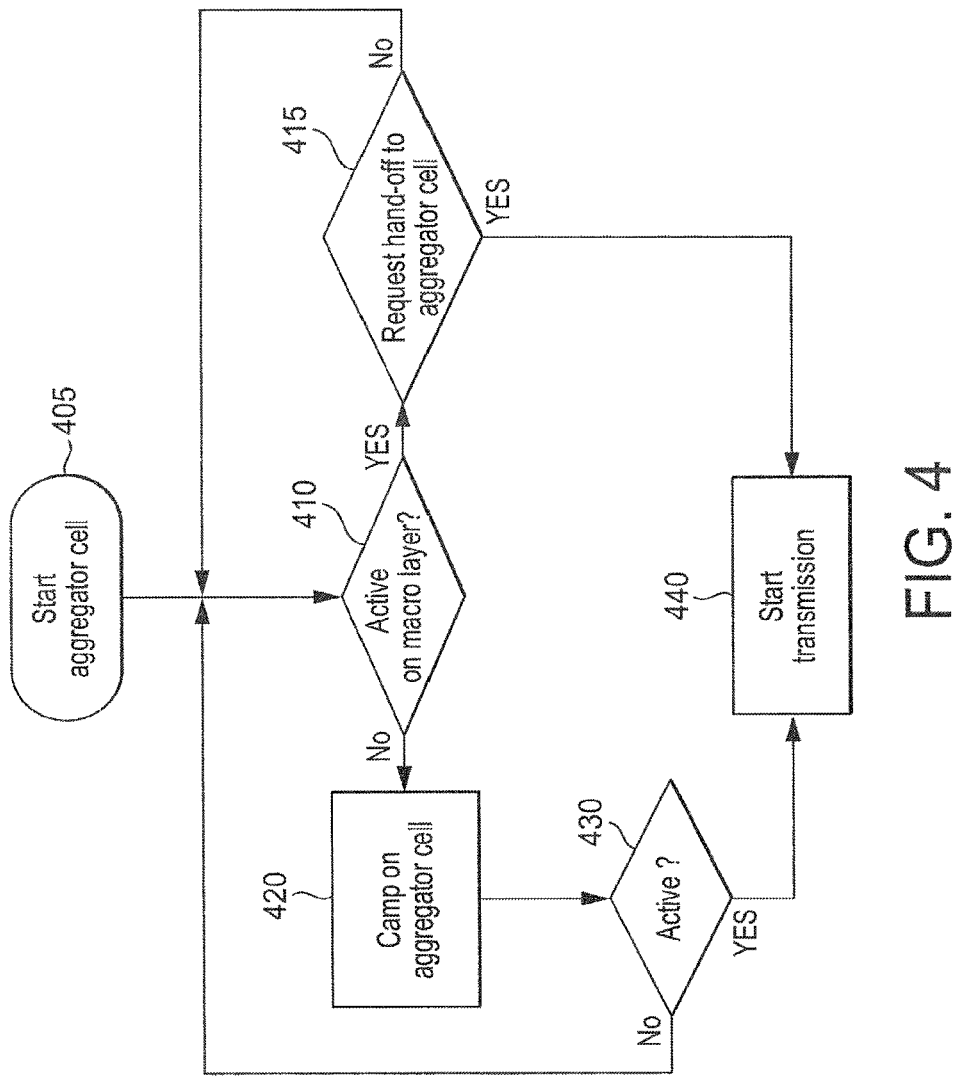
FIG. 4 illustrates the behaviour of nearby communication devices when the aggregator controller of FIG. 3 enables an aggregator layer at a given aggregator.

In FIG. 4, the activity of communication devices nearby an active aggregator are illustrated. Once a given aggregator starts radiating coverage to its own cell 405, the behaviour of nearby communication devices adapts accordingly.

Nearby communication devices (i.e. terminals, such as UEs) that are in idle mode will automatically camp on the newly established aggregator cell 420 (by virtue of the conventional idle mode reselection of the cell with the strongest signal strength coupled with the prioritization of LTE layers broadcast by the LTE eNodeB). If the nearby idle device thereafter enters an active mode 430, transmission starts (or does not start) over the aggregator cell 440. Where there is an on-going existing connection through the macrolayer of the RAN (i.e. it is determined that the nearby communication device is active on the macrolayer) 410, the RAN may optionally, upon request from the aggregator controller, move (i.e. hand-off) the on-going communication of the respective nearby device towards the aggregator cell 415. If such a request is made, transmission starts (or proceeds) over the aggregator cell 440.

Figure 5:
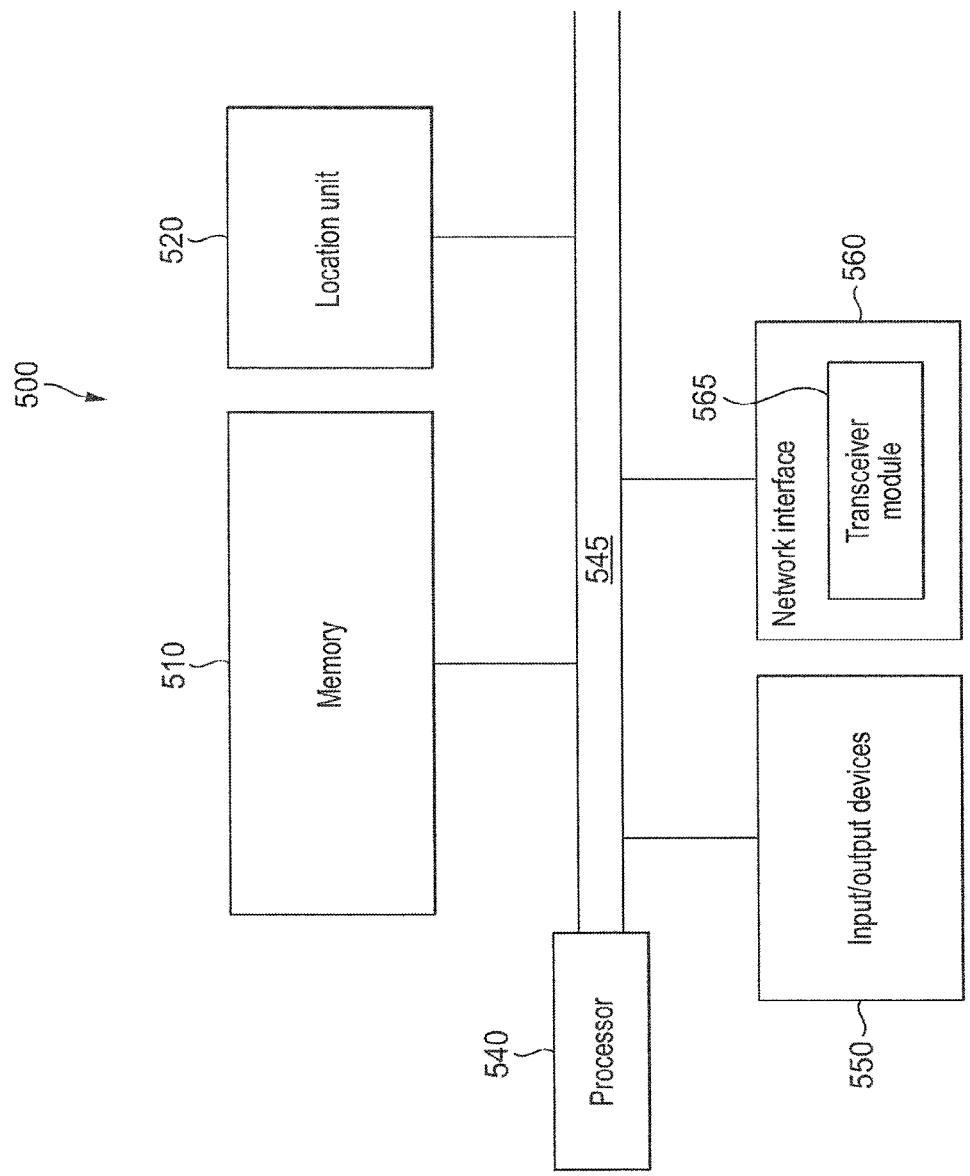
FIG. 5 illustrates the functional elements of a communication device suitable for use in the network architecture of FIGS. 1A, 1B, 1C, 2A and 2B.

FIG. 5 illustrates the functional elements of a communication device 500 suitable for use as an aggregator in the network architecture of FIG. 1A, 1B, 1C, 2A or 2B.

The communication device 500 includes a memory 510, location unit 520, a processor 540, input/output devices 550 and a network interface unit 560 having a transceiver module 565. Data is transferred between the various components via a bus 545. To operate as an aggregator, the network interface unit 560, through its transceiver module 565 must be capable of establishing two separate network interfaces: a backhaul interface and a coverage extension interface. In certain implementations, the transceiver module operates in at least two sets of frequency bands: one set of bands that correspond to the RAT of the macrolayer and a further "out-of-band" set of frequencies not used by the RAT. In some cases, communications on the "out-of-band" set of frequencies use a different RAT from the macrolayer.

In certain implementations, the backhaul and the coverage extension interface might use the same working frequency/RAT as a conventional relay node in order to facilitate the deployment of multi-hop scenarios, in which chains of Radio Access Network entities are deployed. For example, a first aggregator may appear to other communication devices as a Donor eNodeB and a second aggregator may appear to the first aggregator as a conventional UE while providing its own cell to nearby communication devices appearing to them as a conventional Relay Node.

Clearly the backhaul connection from the backhaul interface of the communication device 500 need not be a cellular wireless connection and may include non-cellular wireless and/or a fixed line connection using a connection technology such as: optical fibre cable technology; ethernet technologies; a fixed line xDSL technology; microwave backhaul technology; visible light communications, VLC and/or a Wi-Fi technology.

As noted previously, it is anticipated that many of the candidate aggregators move between two or more static locations over a period of hours or days. It is therefore important that the communication device 500 can, using data obtained from the location unit 520, provide adequate reports of changes in location, which may in turn inform the controller's decisions as to whether the communication device is considered a candidate aggregator and whether, if a candidate aggregator, it should be activated/deactivated as an aggregator.

The location unit 520 may include a global navigation satellite system (GNSS) unit, such as a global positioning system (GPS) unit or the like to provide location information for the communication device 500 as well as cell synchronization if other methods are not available. Alternatively or additionally, the location unit 520 may obtain a location "fix" by inference from the RSRP together with knowledge of the location of cell sites in the macrolayer.

By obtaining a plurality of location fixes of the communication device 500 at different (known) times, the communication device 500 can determine its current mobility level. The mobility level may be determined as a binary determination, i.e. the device may be "static" or "non-static": clearly however a non-static mobility level can be more finely distinguished by characterising the degree and nature of the mobility situations, e.g. semi-static/nomadic scenarios, high mobility, static relative to others (yet changing location), etc. Alternatively, the communication device 500 may report each location fix (together with a time stamp) to the controller and the controller may determine for the current mobility level of the communication device 500. In the latter case, the persistent reporting of location fixes may incur a higher cost in terms of battery usage necessary to facilitate the transmission of such reports.

In certain embodiments, the communication device is not considered a candidate aggregator device if the mobility level is not "static". In other cases, there may be non-static mobility states which nevertheless qualify the communication device to be considered a candidate aggregator device (for example, the detected movement may be determined to be at a speed lower than a predetermined threshold speed, or the change in location may be within a limited geographical area). In the latter case, the controller may determine that an alternative pattern of operation (such as the selection of aggregator selection routines that are more suitable for such qualifying non-static situations) may be needed to ensure effective use of communication devices having qualifying mobility statuses.

While not shown, the communication device 500 may be powered from a battery—such as a rechargeable Li-ion battery, conventional in the field of portable cellular communication devices, such as smartphones. The level of that battery may conveniently be monitored. Alternatively or in addition to the mobility criteria discussed above, the communication device may be rejected as a candidate aggregator device if the monitored battery level drops below a battery level threshold.

In the present discussion, it will be readily apparent to the reader that many alternative and complementary factors may be used to determine whether a given communication device may be considered ready to act as aggregator: mobility status as discussed above is one of a number of useful criteria upon which readiness may be determined. Indeed, mobility status as illustrated—where a simple dichotomy is made between "static" and "non-static" status—is clearly a simplification of a more complex determination of a plurality of categories of "mobility status" (which might span multiple degrees and or types of "mobility", for example).

For example, mobility status may be categorised as:

Stationary—The device is fully static without any detected movement. RF signal analysis location calculation may require a fully static device. A device is deemed to be static with regard to the signals transmitted and received, but there may be small changes in the actual position of the device which cannot be detected and which do not affect the transmitted or received signals.

Semi-static—The device is not fully static but remains in the same cell of the macro network and does not move far away from the original point. The device can move but remains in quite a similar area.

Moving: Low speed—The device is moving slowly, for example at pedestrian speeds (typically 3 Km/h). The device can change macro cell.

Moving: high speed. The device is moving fast (for example at vehicle speeds, typically in excess of 50 km/h) and can change macro cell.

For a device to be determined to be "aggregator-ready" it must fulfil certain physical criteria (e.g. being switched on, capable of receiving and sending signals according to an appropriate protocol, etc.) and fulfils one or more criteria for suitability: for example exhibiting a mobility status that permits effective aggregator operation. Battery life is a significant example of a physical criteria which would also be considered to determine readiness to act as an aggregator.

Even if conditions exist that suggest it would be possible to deploy one or more aggregation layer in a cellular communication network, there must be a good reason to decide to set-up an aggregator layer: in essence there needs to be some tangible expected benefit in doing so rather than persist with the normal macrolayer operation.

Figure 6A:
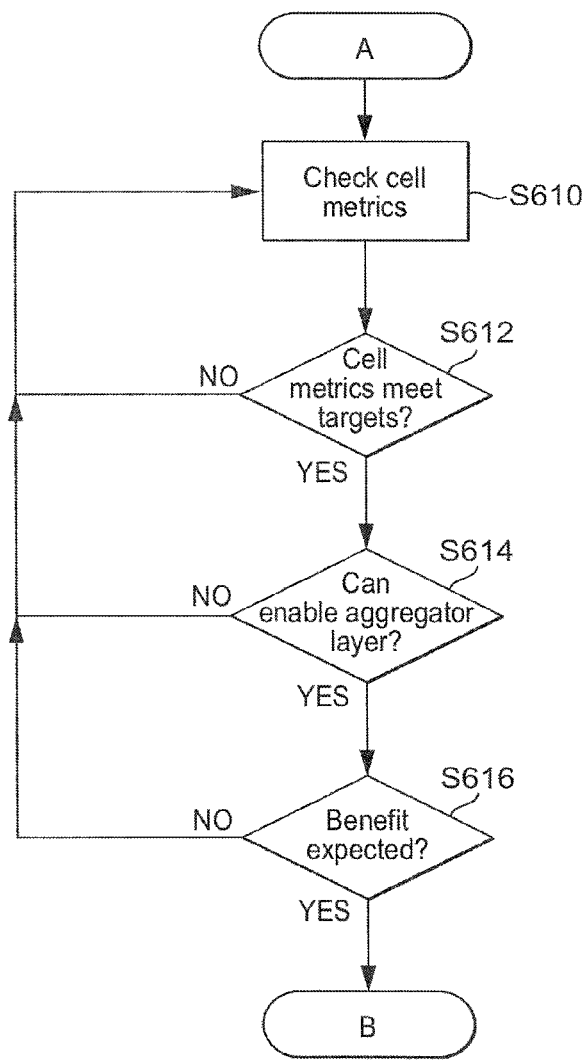
FIGS. 6A and 6B illustrate certain operations of a controller entity in determining whether activation of an aggregator facility is supported.
Figure 6B:
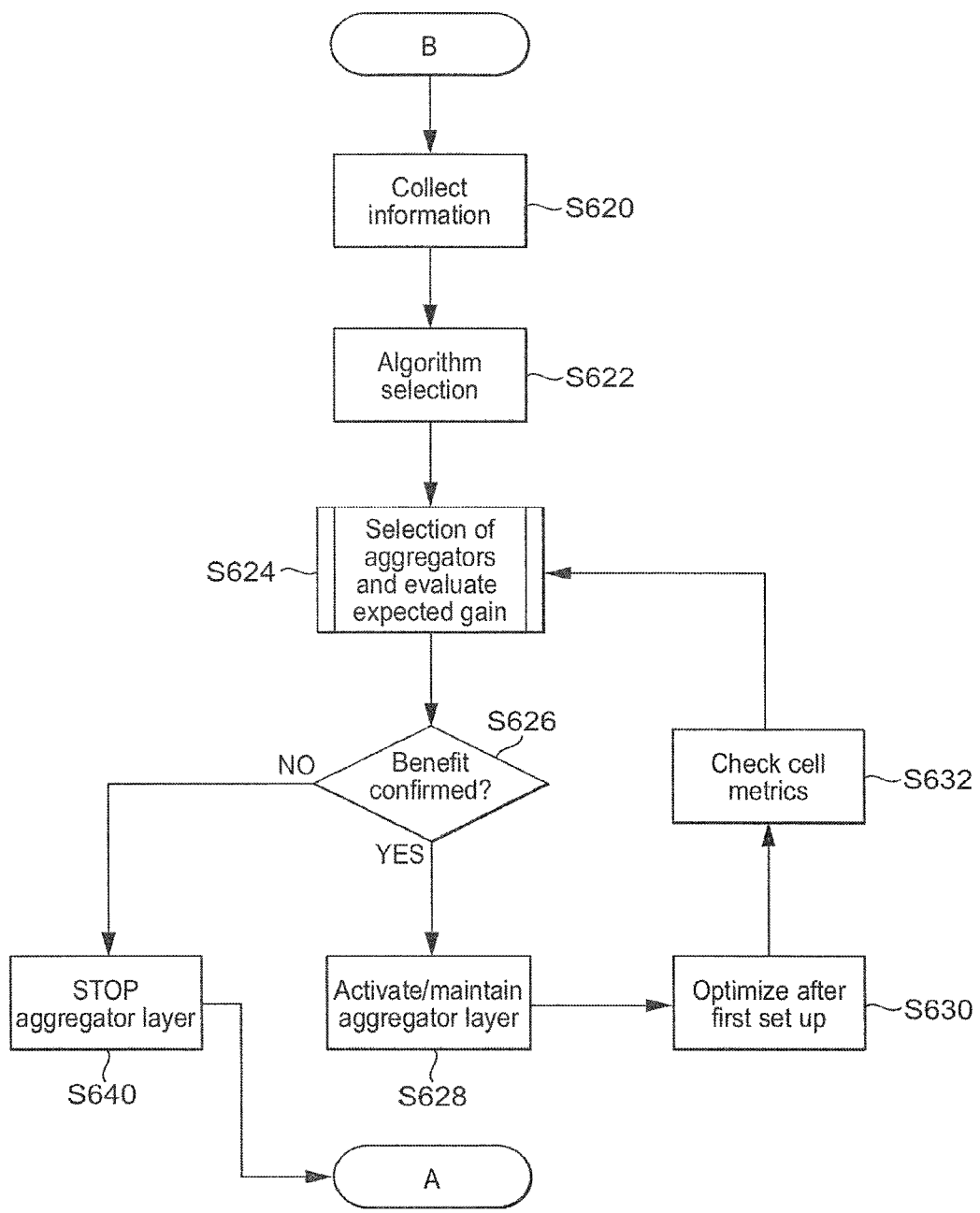

FIGS. 6A and 6B show a flowchart of certain operations performed by a controller entity in determining whether activation of an aggregator facility is supported.

At operation S610, the controller obtains values for one or more cell or user related metrics, referred to hereafter as "cell metrics", thereby checking the performance of the macrolayer. The cell metrics may include for example, measurements of: cell load (for instance, resource block (RB) usage), cell throughput, number of active communication devices located in predefined portions of the cell coverage area, a "happiness" value for the users (measured latency in data transfer, uplink waiting time, or a value obtained by inference from user feedback in social network services, for example); and/or control resource usage (e.g. PDCCH usage).

The cell metrics provide a measure of performance of the macrolayer that is used in determining whether the conditions in a given area of radio coverage offered by a cellular communication network support the activation of an aggregator facility. Here the given area of radio coverage may be selected from: a macrocell coverage area for at least one macrocell within the cellular telecommunications network; a coverage area for at least one sector within the macrolayer of the cellular telecommunications network; and the coverage area of the entire cellular telecommunications network.

In certain cases, the controller may be configured to define the given area of radio coverage which is to support the activation of an aggregator facility by identifying a subset of available cells for which one or more cell parameter conditions hold, e.g. more than a given number of cells in the subset have a cell metric and/or user metric lower than corresponding threshold value. This might result in the area of radio coverage which is to support the activation of an aggregator facility being a subset of the cells in the cellular network covering an entire city.

In FIG. 6A, for example, this determination involves two distinct stages: operation S612, which deals with certain conditions hold that would make activation of an aggregator facility desirable (even necessary), and operation S614, which deals with further conditions which would determine whether such a facility would be feasible. In alternative approaches, the conditions that support activation of an aggregator facility may be performed in other ways, in particular operations S612 and S614 may be performed in parallel with one another or in "reverse" order; furthermore, all conditions may be assessed in a single procedure based on the cell metrics.

At operation S612, the controller determines whether the cell metrics meet target threshold values. This operation may include: determining whether cell load (i.e. RB usage) exceeds a load threshold while throughput lies below a minimum throughput threshold; determining whether the number of users in a region of the cell (such as the cell edge) exceeds a user number threshold while throughput per App falls below a minimum App throughput threshold (an App is a software application executable on a user's communication device: Apps that rely upon network connectivity may be affected if the throughput allocated is below some threshold, for instance, a video streaming App with a throughput lower than 300 kbps would provide an inadequate display output); determining whether a happiness metric (whether aggregated for a number of users or a group of users or not) lies below a happiness threshold; and/or determining whether the usage of control resources (such as PDCCH) exceeds a control resource threshold.

If the cell metrics meet the target threshold conditions, the controller concludes that necessary conditions for aggregator layer deployment hold and moves to operation S614.

At operation S614, the controller determines whether certain conditions sufficient for aggregator layer deployment hold. The controller thus determined whether effective aggregator layer deployment will be possible. Operation S614 may include determining:

whether there are aggregator enabled communication devices (i.e. candidate aggregator devices) in the cell and whether these communication devices have certain characteristics in terms of mobility (e.g. they are, have been for an amount of time, and/or are expected to be, "static");

whether there are communication devices (aggregator enabled or not) in one or more macrocells with certain characteristics in terms of mobility (e.g. they are, have been for an amount of time, and/or are expected to be "static");

whether the controller has access to data concerning path loss towards the macrocell and/or amongst communication devices (e.g. UEs/terminals) and/or location information of the aggregators and/or the other communication devices;

whether there are communication devices in coverage of potential aggregators;

whether there is a matching between the capabilities (technology/band supported) between aggregators and nearby communication devices;

whether at least some of the aggregators have sufficient battery life to maintain aggregator functionality for a predetermined period of time;

whether conditions of low interference hold; and/or whether spectrum and technology resources needed for use in deployment of the aggregator layer are available.

If the controller concludes that sufficient conditions for aggregator layer deployment hold, the controller next performs operation S616. In certain alternative approaches, the controller performs operation S616 before or in parallel with the operations at S612 and/or S614.

In operation S616, the controller makes a preliminary determination of whether a benefit for the network would be expected if the network were to deploy the aggregator layer. This preliminary determination considers a limited number of properties of the cell metrics obtained at operation S610 and thus relies upon a subset of the information necessary for aggregator layer deployment: for instance, a benefit at this stage would be expected because there were several static users at cell edge under the potential coverage of some static aggregators or because there are small cells with unused capacity in an area close to some static users but with aggregators located in their coverage area.

If it is determined that either necessary conditions (at operation S612) or sufficient conditions (at operation S614) are not present, the controller waits a predetermined period of time (by setting a timer for example) and then obtains a further set of cell metrics (at operation S610). Likewise, should it be determined that no benefit is expected from the deployment of the aggregator layer (at operation S616), the controller will again return to operation S610 and obtain a further set of cell metrics.

If however, at operation S616, the controller makes a preliminary determination that there would be an expected benefit, in principle, for the network if the aggregator layer were to be deployed, the controller initiates a more detailed phase of operation (illustrated in FIG. 6B) by collecting further performance information, operation S620 (in addition to the cell metrics obtained at operation S610).

During the collection of further performance information, operation S620, the controller obtains a list of aggregator enabled communication devices (i.e. candidate aggregators) currently camped within a given macrocell, using information updates received, at temporally spaced-apart intervals, from the aggregators. In addition to the list of candidate aggregators, the further performance information may include some or all of the following information obtained from the respective aggregators:

location (of the updating aggregator). This location information may be obtained by the aggregator by inference from the RSRP and/or using a GPS unit.

pathloss/SINR (measured at the updating aggregator). This may be with respect to the current macrocell or a set of macrocells.

mobility level (static or not) measured by the aggregator itself information on location and/or pathloss of all UEs or other network connected communication devices that are static (optionally, this may be filtered to relate only to UEs that are static and that in addition are expected to remain static by analysing and using geolocalized historical information of the UE) and that are camped/or are/have been connected there The controller processes some or all of this performance information to evaluate the relative distance and pathloss/SINR (or similar quality) between candidate aggregators and the devices of users in the cell.

In certain embodiments, the controller makes a selection of aggregators from among the aggregator enabled communication devices in accordance with a single aggregator selection algorithm. In other embodiments, there may be a plurality of available aggregator selection routines (i.e. algorithms) and it is first necessary to determine which routine to adopt. When required, the operation of determining which routine to use may be any conventional selection operation.

FIG. 6B illustrates one embodiment where a plurality of aggregator selection routines are available. Here, the available respective aggregator selection routines may each be suited to respective, different performance conditions. In operation S622, an algorithm corresponding to one of these routines is determined depending upon the availability of specific further performance information, such as aggregator location information or pathloss measurement data. In cases where only a single aggregator selection algorithm is available, the determination of which algorithm to use is trivial and operation S622 may be omitted.

Once it is determined which routine (i.e. algorithm) is suited to the available further performance information, this algorithm determines which, if any, aggregator enabled devices should be activated for aggregator functionality and defines the sub-processes by which benefit (i.e. achievable gain) from aggregator layer deployment will be calculated. The algorithm thus serves to select aggregators from among the candidate aggregators for deployment of the aggregator layer. The operation of this algorithm is illustrated as operation S624 in FIG. 6B.

At operation S624 (whether this is the only available aggregator selection routine or a routine determined to be suited to available further performance information at operation S622), the controller makes a selection from among the aggregator enabled communication devices, this selection being a selection of one or more aggregators based either on individual characteristics of the respective, selected aggregators or collective characteristics when the selected aggregators are considered as a group selected from among the aggregator enabled communication devices.

While the present embodiment contemplates the use of a single aggregator selection routine within a single area, this does not preclude the use of more than one selection routine—for example, the use of a first aggregator selection routine during peak hours of the day or week and a second aggregator selection routine at other times. Furthermore, it is equally contemplated that where two areas of radio coverage are considered separately, each area may adopt a respective, different aggregator selection routine consistent with the information relative to candidate aggregator devices that can be obtained.

It is thus possible that the choice of aggregator selection routine may be fixed based on empirical knowledge (using routines for which sufficient information has been available historically, because the penetration of terminals supporting a network operator client application has become sufficiently high, say) or dynamic (based on how much information is currently available for each routine).

It is further contemplated that the choice of which selection routine to adopt may be governed by a quality metric of the effectiveness of any given routine as a function of the amount of relevant information that can be collected. By obtaining information that might be used by one or more of the possible routine and discarding the routines for which available information is such that that their quality metric is too low, the routine whose quality metric implies it can provide the highest gain for the network would then be chosen.

In certain embodiments, the selection of aggregators includes the selection as a group from some or all possible different groups or subsets of aggregator enabled communication devices, each group being termed an "evaluation group". An expected gain for each evaluation group is then calculated.

In other embodiments, the selection of aggregators is the selection of individual devices (i.e. subsets of aggregator enabled communication devices having a single member each). Here, expected gain is calculated for each individual candidate aggregator.

The expected (achievable) gain results from an evaluation of the expected improvement in a given cell metric: this cell metric may be the, or one of the, cell metrics obtained at operation S610. For example, the expected gain may be the result of a comparison between a) the value of that given cell metric when the or each aggregator is selected and b) the currently experienced (i.e. measured) value of that cell metric.

In certain cases, the expected gain may be expressed as the difference between the value of a given cell metric predicted for a given evaluation group (evaluated before actually activating that group for aggregator functionality) and the current value of the given cell metric. Where no aggregator enabled communication devices are activated, the current value of the cell metric is the measured value of the cell metric for the cellular communication network where no aggregator functionality is activated. Otherwise, the current value of the cell metric is the measured value of the cell metric for the network where a current group of aggregator enabled communication devices are activated for aggregator functionality, said current group need not be the evaluation group. The prediction of the cell metric may be a function of the further performance information collected at operation S620.

Where expected gain is determined for evaluation groups or individual candidate aggregators, the aggregator selection algorithm then assesses the respective expected gains for some or all possible different aggregators or groups of aggregators, the selected aggregator or group of aggregators may be the individual or group providing the greatest expected gain. Alternatively, the selected aggregator or group of aggregators may be selected from a subset of groups having gains that exceed a threshold gain, taking account of other practical constraints such as maintaining aggregators that are already active unless there is a good reason to stop them (e.g. battery level dropping below a level that can support continued operation or detected movement of the active aggregator).

At operation S626, the controller makes a full determination of whether a benefit for the network would be expected if the network were to deploy the aggregator layer by modelling network performance for a network with the selected aggregator or group of aggregators activated and comparing that performance to the currently measured network performance information (as collected at operation S620).

In the case of the aggregator selection using evaluation groups, the full determination of benefit for the network entails comparing the expected gain from the use of the selected evaluation group of aggregators to data representative of the current network performance.

In a specific example where one of the selected subsets of aggregators is not currently active, sufficient benefit from first activation of that selected subset would be confirmed where the measured value of a given cell metric (assuming the given cell metric is the one used in the algorithm at operation S624) is significantly higher than that cell metric measured before the activation.

In another example where the aggregator layer is activated (i.e. at least one subset of aggregator enabled communication devices are activated for aggregator functionality), sufficient benefit is confirmed when the gain is higher than one of a reference average metric (e.g. historical data) or a cell metric measured in the previous last N iterations, where N is an integer greater than 1.

In certain cases, a measured value of a first metric (metric A) is used before activation, whereas after activation, a second, different, metric (metric B) is used instead. Known pre-activation network performance indicators (often referred to as KPIs—or key performance indicators) are used in order to evaluate metric A. Estimated values of metric A are compared to known measured values of metric A, to indicate whether the network needs assistance and to deduce that activation of the aggregator layer will provide that assistance. After activation, metric B may be calculated using both the stored KPIs pre-activation, and the current KPIs measured after activation. If metric B after activation is sufficiently better than metric B before activation, the aggregator layer is maintained active.

If the determination at operation S626 is that a net benefit is indeed provided by deploying the selected device or group of devices (i.e. subset) as the aggregators, the controller activates an aggregator server (operation S628) to support the aggregator layer and instructs each of the selected communication devices to activate (or maintain active) their respective aggregator functionalities (e.g. by executing a routine in an aggregator client application). These aggregator functionalities include functionalities consistent with operation as a MiFi architecture access point (offering WiFi protocol and/or VLC connectivity to nearby communication devices) and/or as a small cell (offering connectivity using a cellular telecommunications standard).

While not illustrated in FIG. 6B, the controller may conveniently launch a RAT selection routine to determine which carrier bandwidth/RAT/band will be used by each (selected) aggregator, the carrier bandwidth/RAT/band being chosen from among one or more permutations of available RAT, band, and carrier bandwidth available for the implementation of an aggregator layer in a specific cell. For instance, the RAT selection routine may determine that as LTE FDD2.6 is not used in current and/or neighbour macrocell, it can be used by all selected aggregators within range of those cells. As discussed in relation to FIG. 4, nearby communication devices may transfer some or all of their data traffic to the selected aggregator(s) differently depending upon whether they are in an "idle" or "connected" state.

In the former case, handoff of idle devices may be facilitated by the controller modifying the neighbour cell list (NCL), which is provided to devices in idle modes, with the parameters of the selected active aggregators.

In the latter case, the controller may determine whether to request a handover for a device in connected state when information such as radio measurements from communication devices in the macro cell compare unfavourably with radio measurements from communication devices using the selected aggregators (always providing such information is available at it might be from access to the relevant RRM function of the eNodeB/RNC in the macrocell). Examples of communication devices for which a handover might be requested include those devices: a) that are in the coverage area of a specific aggregator(s) and b) that have channel quality indicator (CQI) and/or RSRP in relation to the macrocell that is worse than the one of the aggregators.

While not illustrated in FIG. 4, the aggregator may alternatively (or additionally) offer WiFi protocol and/or VLC connectivity to nearby communication devices (thereby operating as a MiFi architecture access point). In such cases, handoff onto the aggregation functionality may be effected by informing respective nearby communication devices which aggregators offer an access point in the cell and by commanding those communication devices close to the identified access points to enable Wi-Fi transmission.

Optionally, the controller may then seek to optimise the aggregator layer, operation S630.

Optimization by the controller may include at least one of the following procedures:

checking, once a given nearby communication device is connected to an aggregator, whether that device has a worse CQI/SINR/RSRP with respect to the macrocell than with respect to the aggregator, and in such a case will be (or can be) handed over to the Macro layer (e.g. by issuing a handover command or releasing the aggregation connection with redirection). Conveniently the selection parameters for this device would be changed for an amount of time to avoid unwanted ping-pong effects (i.e. hysteresis);

checking the performance in the aggregator layer against the performance that would be expected if a given communication device were to stay in the macrolayer, depending on which information can be made available to the controller and/or to the aggregator. Examples of the performance information that may be checked include measures of user happiness metrics such as: latency (i.e. the round trip time (RTT) for transmitted and received packets or uplink waiting time. Examples of the performance information that may be checked may also include: historical data (such as throughput for specific Apps) obtained in the macrolayer in similar or same location and under the same or similar RSRP/CQI conditions;

checking the level of interference and/or availability of resources for the spectrum/technology used in the aggregator layer and taking actions to improve these parameters (e.g. create clusters of spectrum/technology utilization, reduce utilization of those resources in the macrolayer); and optimizing the selection of aggregators taking account of mobility. The aggregators themselves may be required to take certain actions when aggregated users (i.e. communication devices using the aggregation facility of a selected aggregator) start mobility. Likewise, when aggregators themselves become mobile, the controller may act to alter the performance of the aggregator later, e.g. by instructing the newly mobile aggregator to switch off aggregation functionality.

Checking the performance in the aggregator layer using RTT may involve comparing RTT for the same packet using macrocell and current aggregator layer service respectively. Using uplink waiting time to check performance may involve comparing this time before and after the optimization.

Checking the performance in the aggregator layer using historical data may involve comparing historical data to actual data obtained through the aggregator. It is also possible to run periodical speed tests just to check the current quality.

Whether optimised as described or not, the controller iterates back through operations S622, S624 and S626, selecting one or more aggregators which may be identical to the aggregator(s) selected in previous iterations or may represent a group having a different constitution of aggregator enabled communication devices.

Periodically, cell metrics are checked—operation S632— and this information is used in further iterations of operations S622, S624 and S626. The cell metrics checked here may be the same as those obtained at operation S610: equally they may be different from those cell metrics.

If the determination at operation S626 is that a net benefit is not in fact provided by deploying the selected devices (or group of devices) as aggregators, the controller halts the use of the aggregator layer operation S640. This may entail instructing all aggregator enabled communication devices in the cell to deactivate their aggregator functionality and to deactivate the aggregator layer server in the controller.

After a second predetermined time (typically longer in duration than the period characteristic of the iteration of operations S622, S624 and S626), the controller restarts first phase of determining the preliminary benefit of aggregator layer deployment at operation S610.

To provide the information needed by the controller to perform the operations described in FIGS. 6A and 6B, communication devices are arranged to present information upon which the controller can make its respective determinations of suitability of the device as a candidate aggregator and whether a suitable candidate is to be activated (or deactivated).

Figure 7:
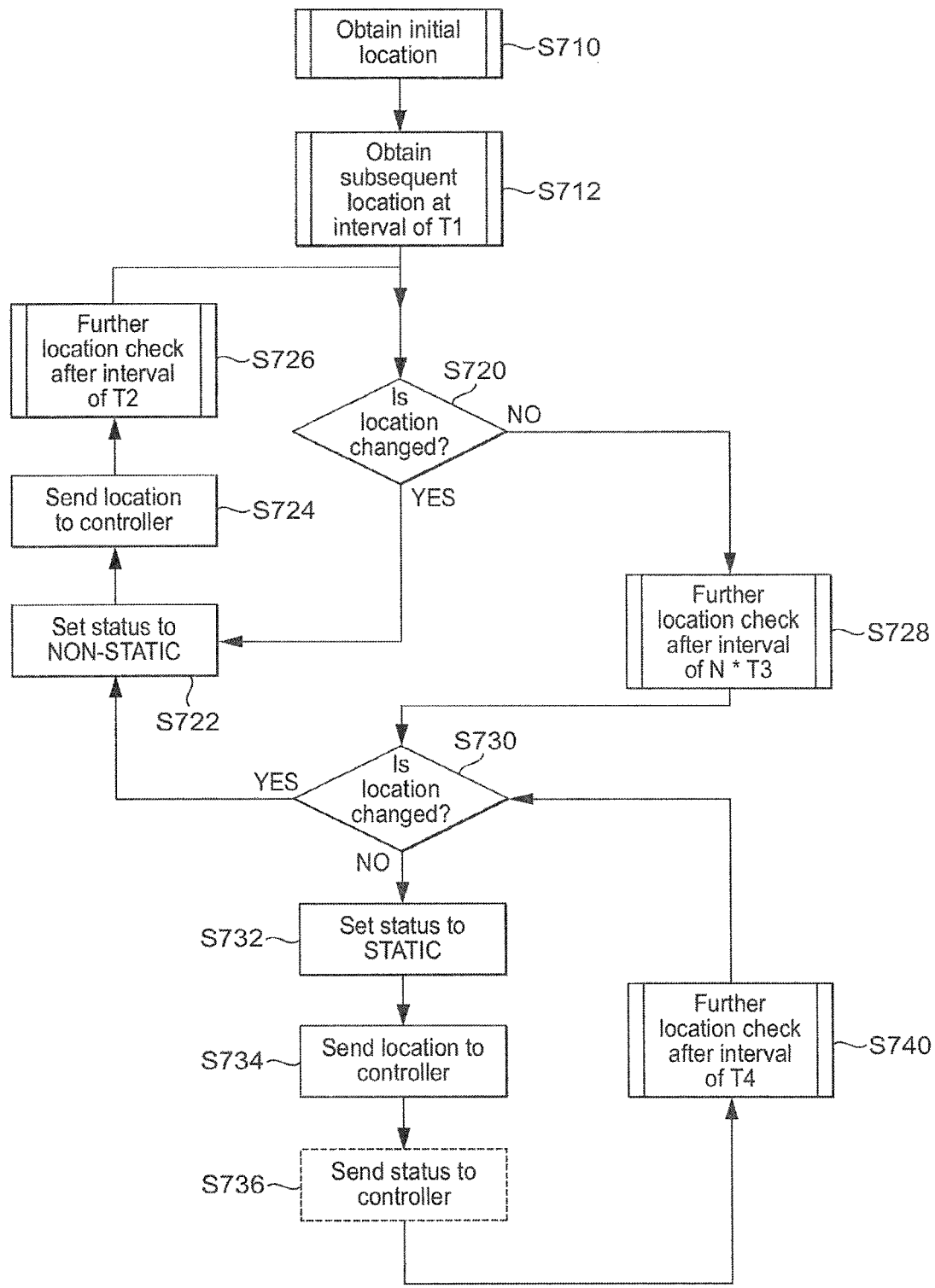
FIG. 7 shows a flowchart showing certain operations of a communication device associated with mobility status.

FIG. 7 shows an exemplary flowchart showing certain operations of a communication device in accordance with an aspect of the present disclosure.

In FIG. 7, the communication device evaluates its current location at temporally spaced-apart intervals (e.g. every T1 seconds). Once there are at least two measures of location (i.e. location fixes) it is possible to determine whether there has been any change in the mobility state of the communication device. Any given location fix is conveniently obtained with a minimum level of accuracy. The time difference between the acquisition of the location fixes is used to determine the degree of mobility (if any) between two fixes. To ensure that fixes are sufficiently far apart in time for a significant movement to be detected each fix is conveniently associated with a corresponding time stamp (which may be acquired from a connected macrocell and/or within the GPS signalling structure). Where more than one communication device is used it is contemplated that they may be operated in a synchronised manner.

An initial location fix is obtained at time T0, operation S710. At a point in time T1 seconds later than T0 a further location fix is obtained, S712.

The location fixes T1 seconds apart are compared to determine whether there has been a change in the detected location, operation S720.

In other embodiments, the algorithm used to determine whether a change in location has occurred may alternatively or additionally use parameters other than reported position and time, for example direction of movement or altitude.

In general terms, a potential aggregator may be considered to have moved (i.e. changed from a "static" state to a "non-static" state) if its position is displaced by a distance of D metres over a time interval $T_i - T_{(i-1)}$, where D and $T_i$ can be determined, calculated, signalled or otherwise obtained dependent on parameters (e.g. current mobility state).

Where the location has changed between the fixes, the mobility state is set to be "non-static", operation S722. For the sake of clarity, the scenario illustrated in FIG. 7 shows the determination at operation S720 as binary between "static" and "non-static", on the basis of any detected change in location. The skilled reader will readily appreciate that alternative determinations, having more than two cases or indeed two cases decided upon different criteria, may be substituted for the current operation S720 without requiring any other alteration to the flowchart. For example the change in location between fixes may be registered as indicating a "non-static" state when the location has changed by more than a minimum position change threshold of D1 metres since last location fix.

When in non-static mobility state, new location fixes are sent to the controller, operation S724 and a further location fix is taken after an interval of T2 seconds/minutes, operation S726. Typically the time scale T2 is greater than T1, but could be the same or less than T1: sending updates will use power, computation and signalling resources etc. so this task would be performed less frequently when the latest information is that the device is in mobility (and presumably not currently for consideration as a candidate aggregator). The operation flow then returns to operation S720, where it is again determined whether there has been a change in the detected location. In this way the location is still checked in case the mobility state has changed to "static". If the communication device has become static but the latest report still indicates that its state is "non-static", the use of a T2 greater than T1 will merely result in a slight delay in considering it as a potential candidate for activation.

Where the location has not changed between the fixes, it is determined that the mobility state may be "static" but that further fixes are required to be more certain. In the illustrated case, it is considered that a communication device needs to have been static for a longer period than the interval of T1 between successive fixes in operations S710 and S712 (during initialisation) or the interval of T2 in operation S726 (in subsequent iterations).

To avoid a situation of "false" attribution of "static" status to a device (which may after all be embedded in a vehicle) just because the device has stopped temporarily (e.g., car that has stopped at a light, to re-fuel or in heavy traffic, or a car that has temporarily parked), the communication device obtains a further location fix at time N*T3 seconds later, where N and/or T3 could be dependent on the type of communication device (e.g., in a car, residential) or type of scenario of installation (e.g., at a bus terminal, in a scenario that is likely to be static), operation S728. For example, if the scenario is likely to be static, it may be adequate to set N or T3 equal to zero or close to zero as it may be assumed that an earlier indication of "static" status at operation S720 is likely to be correct.

The location fixes N*T3 seconds apart are compared to determine whether there has been a change in the detected location, operation S730. If at the end of the period N*T3 the position is still unchanged, the mobility state is set to "static", operation S732. The current (static) location fix is sent in a reporting message to the controller, operation S734. Optionally, the communication device may also indicate that it is in the "static" state (either in the same reporting message as operation S734 or in a separate status reporting message), operation S736. This option may be considered convenient as it facilitates understanding of why the location fix was reported. Alternatively, the controller may infer that because it has received a reporting message having a location fix from the communication device, it can conclude that the reporting communication device is static.

Where location fixes are derived from GPS-based position signalling, the location fix may be sent as GPS location information (i.e. based upon the WGS84 standard) rather than latitude and longitude alone. Conveniently, the reporting message may include an indication that the location information is in GPS position format. Alternatively or additionally, the reporting message may include an indication that GPS information is available, regardless of the source of the reported location fix.

A reporting message (either the same reporting message as operation S734 or in a separate additional information reporting message) may optionally include additional information, for instance: specifics of the candidate aggregator: e.g. device model, software release information, hardware identifiers, etc; device state, such as battery status; and/or radio information, such as camped Cell Id, Radio coverage quality, CQI of radio channel used to perform such a communication, neighbour cells for the communication device modem, etc.

The flow then iterates, whilst the communication device is in mobility state "static". The communication device obtains a further location fix after an interval of T4 seconds, operation S740. T4 is typically a shorter time period than T2, since it is desirable to avoid a communication device being considered "static" when it is in fact "non-static": any static communication device is a potential candidate aggregator, so any false attribution of "static" status may have a detrimental effect on the delivery of an effective aggregator layer. The operation flow in the "static" mobility state then returns to operation S730, where it is checked once again whether the detected location has changed. Any change in location results in the mobility state being set to non-static and location fixes being taken at intervals of T2 (rather than T4).

In a further arrangement of the present disclosure, more than one aggregation layer is activated within the network. In certain cases, respective aggregation layers are activated and deactivated in corresponding sectors or groups of sectors of the cellular network. In certain cases aggregation layers are established within one sector or cell that extend the coverage of that sector or cell to encompass communication devices served by neighbouring sectors or cells: thus the benefit to the network of the deployment of any given aggregation layer may be calculated for a region of the radio coverage of the cellular network that includes more than one sector and/or cell.

Certain arrangements of the present disclosure relate to the dynamic activation of one or more communication devices to provide an aggregation layer. Each of the one or more communication devices appears, to the macrolayer as a UE; while to other communication devices, they each appear as a class of small cell base transceiver station. The dynamic activation is due in part to determining if a benefit could be expected by such dual UE/small cell activation: that might arise if the macrolayer doesn't provide a prerequisite quality of service to the other communication devices. Dynamic activation also requires a more fine-tuned determination dependent upon selecting a set of devices capable of the dual UE/small cell or UE/MiFi functionality for activation and determining whether the network would benefit from the activation of that particular group. Only where the network is determined to benefit on the basis of this fine-grained determination will the selected communication devices be activated as hybrid UE/small cells (or UE/MiFi devices).

Likewise certain embodiments of the present disclosure relate to the dynamic deactivation of an aggregation layer provided by certain communication devices.

Considering once more the simplified example of a binary determination of whether a communication device is in "static" or "non-static" state, it is clear that once an aggregator device has activated an aggregator mode (and radiates a small cell, VLC or WiFi coverage, for example) it is desirable to monitor the location of the device in case there is a change in that mobility state and method to deal with change of mobility state: "non-static" state being presumed incompatible with effective aggregator functionality.

Figure 8:
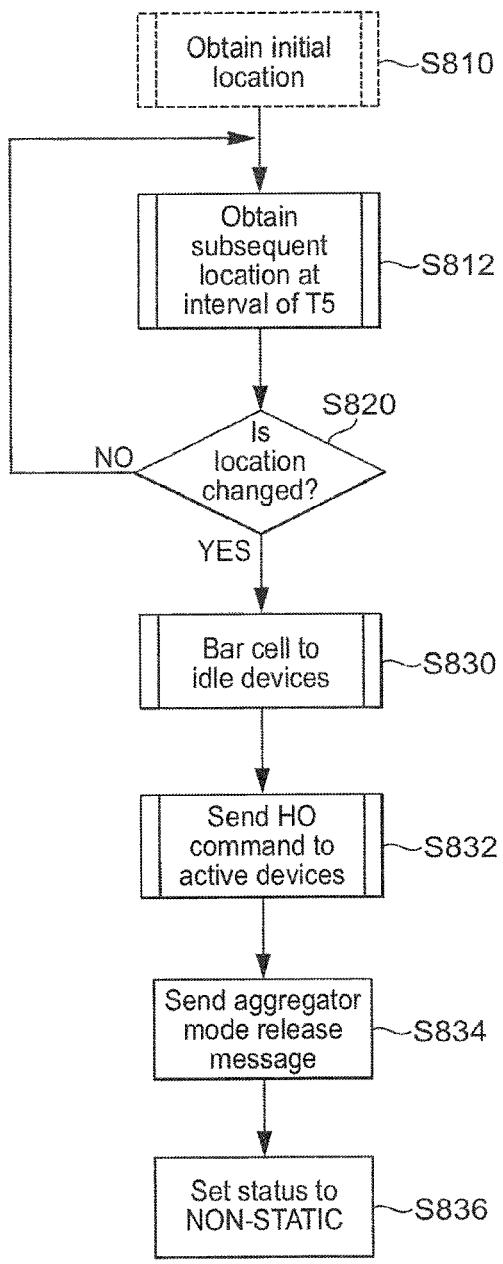
FIG. 8 shows a flowchart showing certain further operations of a communication device associated with mobility status.

This scenario is illustrated in FIG. 8.

Once the communication device has been activated, the communication device monitors its location every T5 seconds (obtaining an initial location fix at operation S810, if necessary and further location fixes at operation S812). T5 needs to be a very short time as it is crucial to determine as soon as possible whether the communication device is still "static" since the performances of the network may be affected. Note that this may be the same iterative monitoring of mobility status as at operation S740 of FIG. 7 or a distinct iteration at a different time interval specific to monitoring the operation of active aggregator devices.

The location fixes obtained at operations S810 and S812 are compared, operation S820, and if location changes (to a predetermined degree of accuracy, etc.), the communication device will immediately bar the cell (so that the UEs in idles will not connect), operation S830 and send handover commands to all the communication devices connected to the aggregator cell and to the macrocell. The handover procedure from aggregator cell to macrocell may then be handled according to any conventional standardised handover procedures.

The communication device sends the handover command because it effectively operates as a base station for the aggregator cell when it is activated.

The cell barring is important in order to prevent nearby communication devices in idle mode from attempting to connect to the cell radiated by the communication device, while that cell is still being radiated, to support the handover operation, for instance.

Conveniently the deactivating aggregator device sends the controller a message including an indication that aggregator-state has been released giving the cause as "mobility".

Additionally, the deactivating aggregator device may then update its mobility state to "non-static".

The communication device may additionally monitor its battery life every T6 seconds. As noted previously, low battery level may preclude the communication device from being considered a candidate for activation. If expected remaining battery duration is lower than T7 seconds/minutes, the active communication device may conveniently gradually deactivate the aggregator mode by performing operations similar to operations S832 and S834. In this case however, handover commands will be executed, and confirmed completed, one at a time, before sending out further handover commands.

As will be apparent from the preceding discussion, it is assumed that the interactions between controller and communication device are governed by a shared communication protocol.

Using this protocol, the controller can send information requests to one or more communication devices (aggregators), specifying any additional information it wants to receive.

The communication device likewise uses the shared protocol to respond to such information requests, providing the requested information, which may for instance consist of the following:
- Mobility State
- Communication device specifics: e.g. device model, software release, hardware identifiers, etc. [0310] Device State: battery status
- Radio information: Serving Cell Id, Radio coverage quality (e.g. Serving Cell RSRP, Serving Cell RSRQ, etc.); CQI of radio channel used to perform such a communication, Neighbour cells for the UE modem
- Radio measurements executed on neighbour cells, detected cells on other LTE frequencies that are not part of the neighbour list, Wi-Fi access point identifiers (i.e. SSIDs) and strength detected onto Wi-Fi receiver Conveniently, the communication device may maintain a protocol connection open by sending dummy bits for the next Z seconds, otherwise it stops sending dummy bits.

Using this protocol, the controller can also send commands instructing the Communication device to enter into aggregator state (i.e. as a either a small cell and/or Wi-Fi Access point). The communication protocol for such a command includes a set-up command (sent to the communication device) providing the following information: LTE carrier to be used for transmission, and main parameters; transmission, TX, power to be used: (default is "MAX TX Power); optionally, a parameter for setting-up a second carrier; optionally, a parameter to set-up a Wi-Fi Access Point; time of the day in which the cell shall start radiating; Parameters needed to manage the status of local algorithms within the Communication device whilst in the aggregator state.

Once the command to enter aggregator mode is received, the communication device uses the shared communication protocol to obtain, from a controller database or a database within the OSS server, the parameters needed to set-up the aggregator cell: for example, IP addresses (if not derived with a fixed rule from current R-UE IP address). Alternatively, the communication device may use the parameters used last time it acted as an aggregator, provided that some criteria are still met: for example that the location is still the same as last time; that, while the location has changed, the RAU is still the same; that, while the location has changed, the R-U camped in the same cell as last time.

Once the communication device has the information needed to set-up the aggregator cell, it prepares its transceiver module (565, FIG. 5) to be ready to radiate. The communication device then starts radiating at the requested Time of the Day. The Communication device then confirms to the controller that it is radiating (i.e. that the aggregator mode is active).

Whilst the communication device is in aggregator state, the communication protocol may also be used by the controller to request provision of additional information, such as: Battery status; Number of connected communication devices; Average Resource Blocks occupation; Average CQls of the connected UEs; and Average CQI of the connected Modem.

In a typical telecommunications network architecture that includes a radio access network (RAN), a core network (CN) and a packet data network (PDN), communication devices, such as mobile terminals, user equipment (UEs) and wireless access stations, establish wireless connections to the network by means of the RAN. In the LTE standards, the core network is referred to as the Evolved Packet Core (EPC) and the data transferred over this wireless connection are carried by a virtual connection between the UE and the PDN, known as an "EPS bearer" (where EPS stands for Evolved Packet System).

Within communication devices that offer aggregator facilities as LTE small cells, the network interface unit 560 sets up a connection to the EPC using an EPS bearer as transport layer. Network interface units 560 of these communication devices thus connect to the macrolayer in a conventional manner, appearing to the macrolayer as if they belong to a conventional UE. For convenience, such LTE small cell are added to the same Routing Area (RA) as the macro cell providing coverage to the small cell.

Optionally, such devices may be assigned a different security profile so that the "conventional" connection to the EPC may be adapted to handle an alternative connectivity to a Security Gateway (SecGW) within the EPC. Small Cell might then be allowed to connect to the EPC without establishing their own IPSec (since Small Cell traffic goes through an LTE modem (i.e. a macrolayer interface of the network interface unit 560) that connects to a macro cell, and since that macro cell is in turn connected to the SecGW).

Conveniently, this "conventional" connection also allows voice and SMS services to be delivered using a legacy circuit-switched network such as GSM. So-called Circuit Switched FallBack (CSFB) within LTE may be necessary to support circuit-switched calls in some networks.

To implement the connection 1) between the communication device in aggregator mode and the EPC and 2) between the aggregator device and nearby communication devices, the network interface unit 560 includes two separate network interfaces: a coverage extension interface arranged to provide the services of a normal Small (or Pico) Cell and a "backhaul" interface, which serves to provide "conventional" connectivity to the EPC. The network interfaces are paired when the communication device is in aggregator mode. In the following discussion the "backhaul" interface is referred to as "R-UE" in recognition of its UE-like appearance to the macrolayer.

Figure 9:
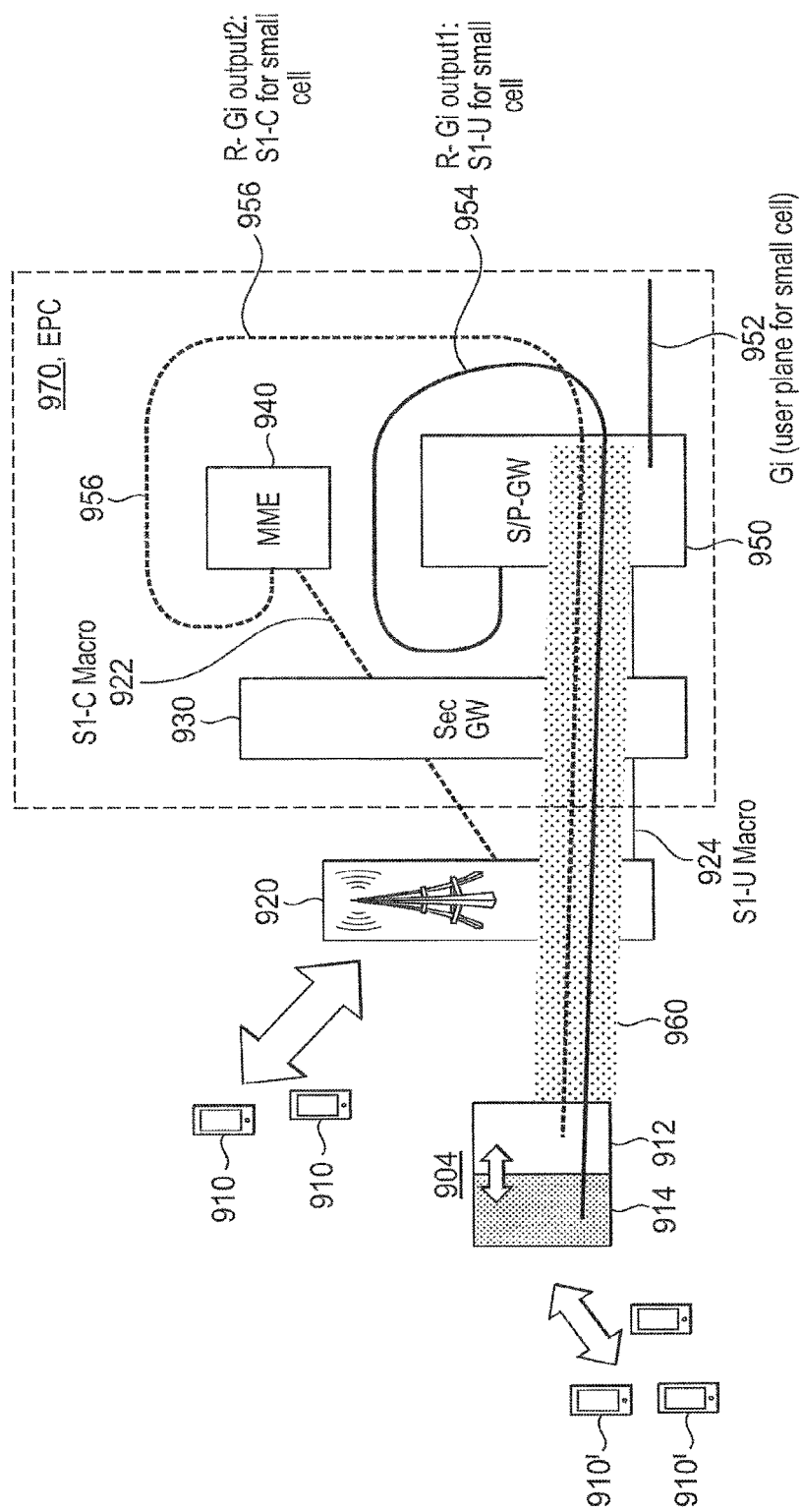
FIG. 9 illustrates the use of EPS bearer as a transport layer for connectivity between an aggregator device and the core network.

FIG. 9 illustrates diagrammatically how an eNodeB in the macrolayer, provides LTE coverage (typically FDD) to a set of UEs 910, amongst them an aggregator device 904 having an interface R-UE 912. Certain UEs 910' are shown camping on the coverage area provided by the aggregator device 904 through its small cell facility 914.

An EPS bearer 960 is established by the R-UE 912 through the macro layer (i.e. eNodeB 920) and into the EPC 970. The EPS bearer 960 transfers data from the aggregator device 904 across a security gateway (SecGW) 930 to a further gateway 950 (which may be a serving gateway S-GW or a PDN gateway P-GW that provides an interface to the PDN). The control node in the EPC is the Mobility Management Entity (MME) 940: this node serves to control the behaviour of the entities in the EPC and terminates certain communications from the small cell after they have been output from the EPS bearer 960.

The "normal" output of the S/P—GW 950 is carried over a Gi interface 952. Where the EPS bearer output (R-Gi) includes S1-U interface data (i.e. user plane data) for the small cell, 954, this is terminated in the S/P-GW 950. Where the EPS bearer output (R-Gi) includes S1-C interface data (i.e. control plane data) for the small cell, 956, this is terminated in the MME 940. In this specification, S1-C is used as a synonymous of what is termed in 3GPP standards as S1-MME. S1-C interface data (i.e. control plane data) for the macro cell, 922, is also terminated in the MME 940; while S1-U interface data (i.e. user plane data) for the macro cell, 924, is also terminated in the S/P—GW 950.

Figure 10:
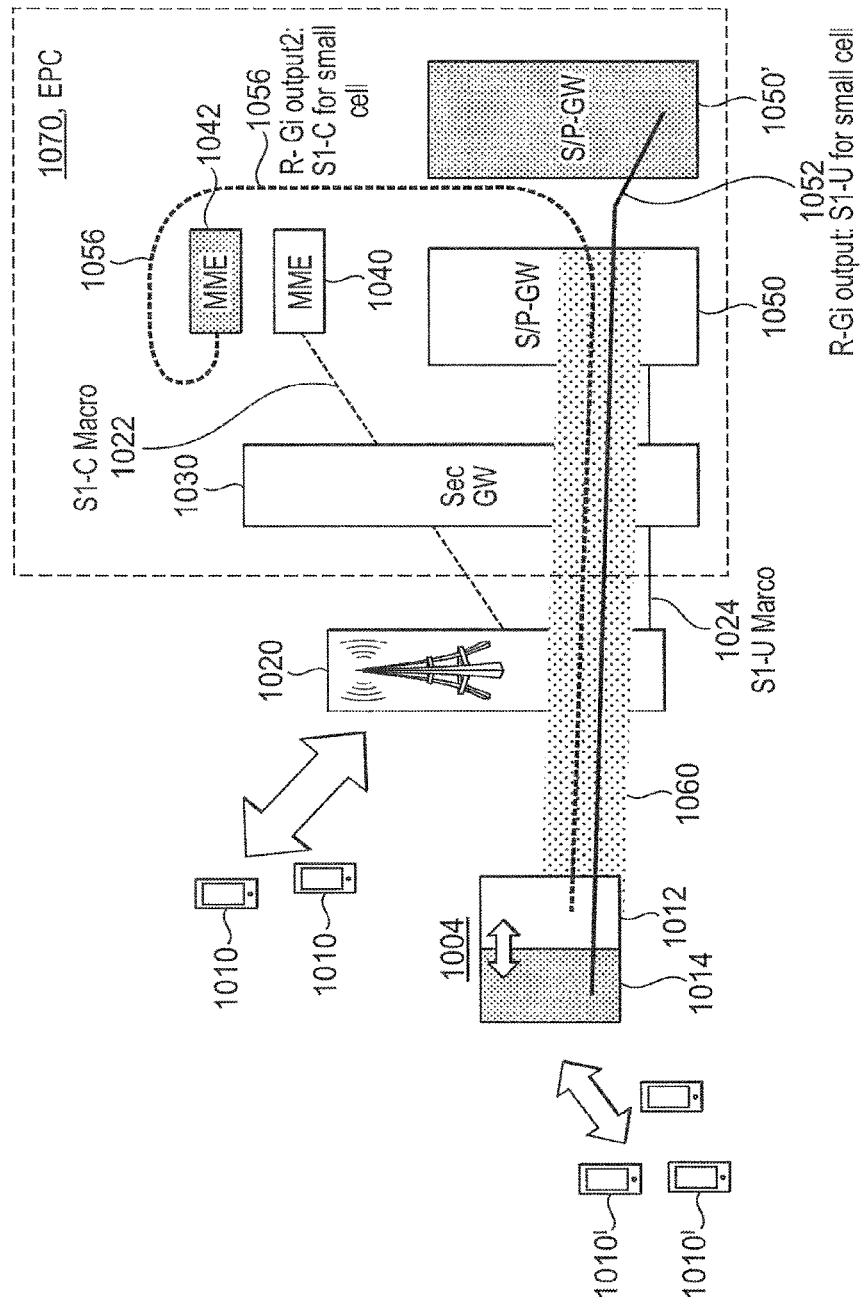
FIG. 10 illustrates a variation upon the arrangement in FIG. 9.

In as variation of the arrangement of FIG. 9, the functions for macro and small cell operation are logically split as if they were being handled by different EPCs. FIG. 10 illustrates this logical division.

As for FIG. 9, FIG. 10 illustrates an eNodeB 1020 representing macrolayer LTE coverage provided to a set of UEs 1010, amongst them an aggregator device 1004 having an interface R-UE 1012. Certain UEs 1010' are shown camping on the coverage area provided by the aggregator device 1004 through its small cell facility 1014.

An EPS bearer 1060 is established by the R-UE 1012 through the macro layer (i.e. eNodeB 1020) and into the EPC 1070. The EPS bearer 1060 transfers data from the aggregator device 1004 across a security gateway (SecGW) 1030 to a first logical gateway 1050 (which may be a serving gateway S-GW or a PDN gateway P-GW that provides an interface to the PDN). A first logical control node 1040 serves to control the behaviour of the entities in the EPC 1070 and terminates certain communications from the macrolayer. A second logical control node 1042 terminates certain communications from the small cell after they have been output from the EPS bearer 1060.

The "normal" output of the S/P-GW 1050 is carried over a Gi interface to the PDN. Where the EPS bearer output (R-Gi) includes S1-U interface data (i.e. user plane data) for the small cell, 1054, this is terminated in a second logical gateway, S/P—GW 1050'. Where the EPS bearer output (R-Gi) includes S1-C interface data (i.e. control plane data) for the small cell, 1056, this is terminated in the second logical MME 1042. S1-C interface data (i.e. control plane data) for the macro cell, 1022, is terminated in the first logical MME 1040; while S1-U interface data (i.e. user plane data) for the macro cell, 1024, is terminated in the first logical gateway S/P-GW 1050.

Figure 11A:
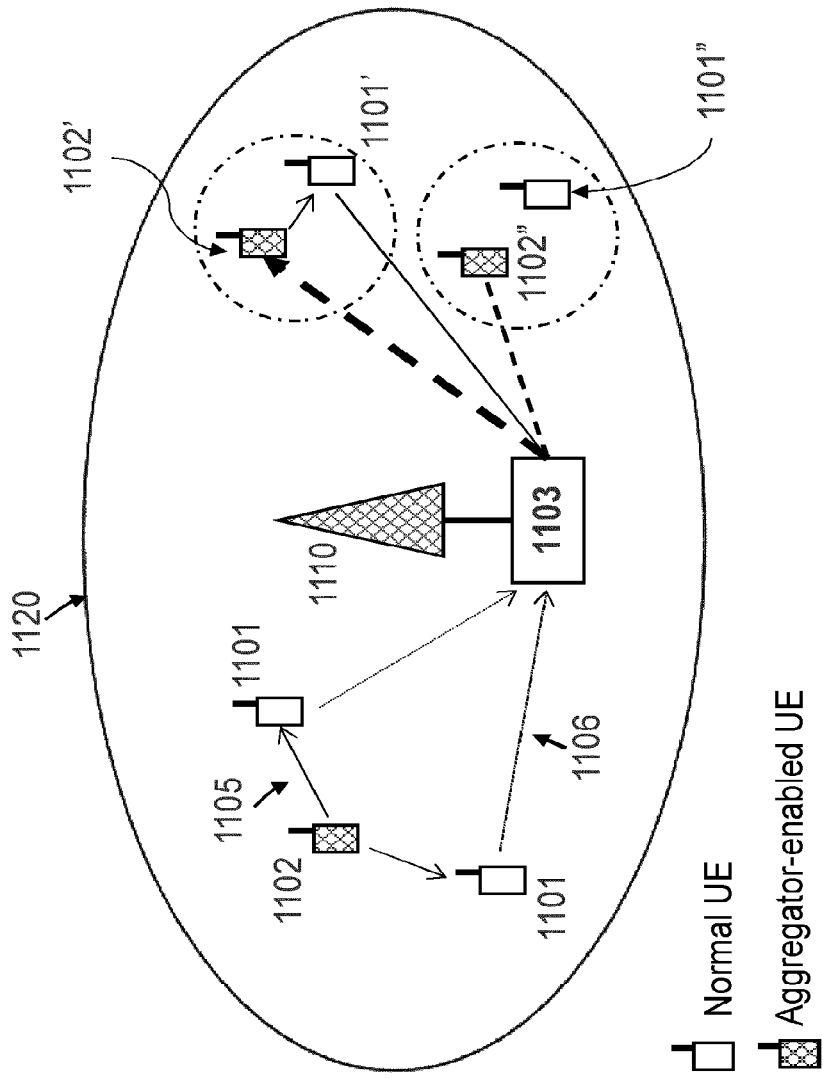
FIGS. 11A, 11B and 11C illustrate further instances of radio access networks where certain communication devices are controlled to generate a beacon signal for use in generating a coverage map.
Figure 11B:
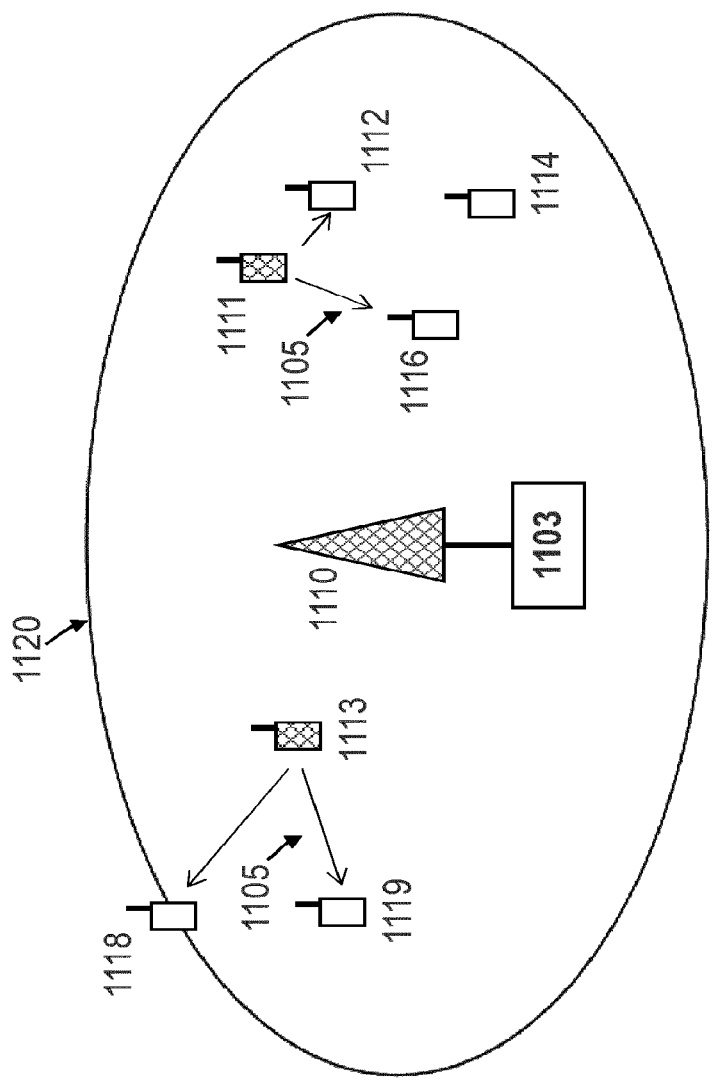
Figure 11C:
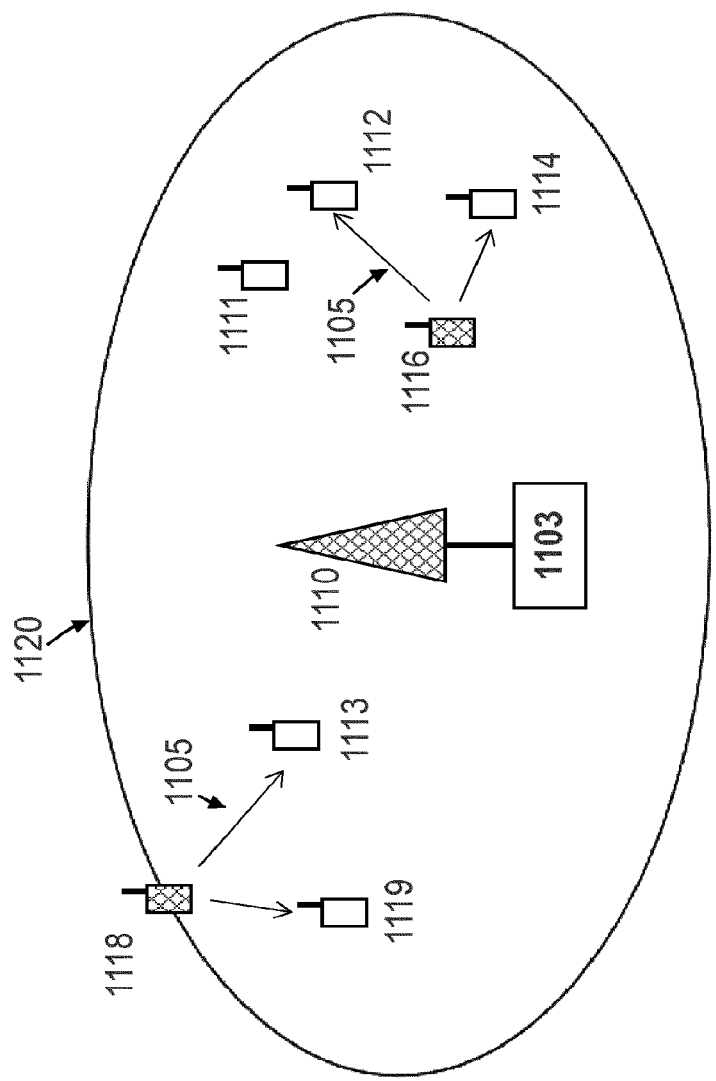

FIGS. 11A, 11B and 11C illustrate further instances of radio access networks where certain communication devices are controlled to generate a beacon signal for use in obtaining information from other communications devices (e.g., in order then to generate a coverage map as described in the example below), which in turn is used to select which communication devices are to be activated as aggregators.

FIG. 11A illustrates a scenario where certain second communication devices 1102 are not currently acting as aggregators. In particular, second communication devices 1102, 1102', 1102" and first communication devices 1101, 1101', 1101" are shown in a telecommunications network comprising a controller entity 1103; in FIG. 11A the controller entity 1103 is in communication with an eNodeB 1110 providing a macrolayer cell 1120.

The controller entity 1103 is configured to activate the second communication devices 1102 to broadcast beacon signals 1105. The RF bands upon which the beacon signals are broadcast may be close to, for example, 2.6 GHz either as FDD LTE2600 or TDD LTE2600. The transmission power may be set by the controller entity 1103 or, if not possible, the second communication devices 1102 may communicate, to the controller entity 1103, the transmission power which is being used via Wi-Fi or Bluetooth.

The first communication devices 1101 receive the command to scan and listen to the WiFi or Bluetooth bands, and to report 1106 to the controller entity 1103 the power of the broadcast signal received from any second communication devices 1102 or potential aggregator.

The controller entity 1103 is able to build a comprehensive pathloss map between first communication devices 1101 (active or idle) and the second communication devices 1102 (i.e. potential aggregators), and use this information to select the aggregators to be added according to any suitable method.

In an example, the potential aggregators periodically activate or deactivate an application to broadcast a beacon signal in barred state in the corresponding bands (in TDD or FDD, at 2, 6 GHz, say); first communication devices 1101 that are candidates for aggregation are requested, by the telecommunications network, to measure these bands whilst in connected mode and to report the discovered Cells and—if possible—the signal level to the eNodeB 1110.

Knowing the transmitted power as well as the received power level by the communication devices allows to define a pathloss between each potential aggregator 1102 and each first communication device 1101; for example if the received signal is low, it may mean there is too much distance between a specific potential aggregator 1102 and a first communication device 1101, and as a consequence, the pathloss is high.

A small portion of the FDD or TDD spectrum of the networks may be dedicated for the activity of sending the temporary beacon signal 1105. Advantageously this reduces the potential interference towards an aggregator, once in service, due to potential aggregators 1102 during the construction of the pathloss map.

There may be alternatives for the first communication devices 1101 to report 1106 measurements to the controller entity 1103. All the first communication devices 1101 may be instructed to report to the CN and second communication devices 1102 or aggregators 1102',1102" using 3GPP mechanisms to report the observed TDD or FDD cells used by the aggregator layer (i.e. the network of terminals acting as Small Cell/Access Points that are dynamically switched-on depending on availability, battery life, location, expected benefits etc.) and detected carriers in an area, and then sending all this information to the controller entity 1103.

In another alternative, some or all of the communication devices 1101, 1102 may be provided with an application that: either connects with a chipset ordering to report the TDD/FDD cells 1120 used by the aggregator layer, or opens the Wi-Fi receiver; observes the applications detected in area; and reports the measurements to the controller entity 1103.

The communication devices 1101 located around an aggregator 1102 may be the ones instructed to report to the controller entity 1103. In an alternative embodiment only the communication devices 1101 within a specific area may be instructed to report to the controller entity 1103.

The first communication devices 1101 that are candidates for aggregation need to measure the quality of the coverage they might get from an aggregator 1102 before the aggregator has come to service.

The information that is reported 1106 back to the controller entity 1103 may include information concerning received power. The quality of the received signal may also be reported. Besides, this information may be reported using a 3GPP mechanism, for example, the LTE specification inherently supports a self-organizing network (SON) function in which features like Automatic Neighbour Relation (ANR) use the normal measuring report including cells that are not part of a neighbour list.

Alternatively Wi-Fi may be used as a beacon. It may be initiated via a dedicated application for which a design for a reporting method may be implemented, e.g. report periodically in an area in which it is expected to have an aggregator layer.

The map of coverage (i.e. pathloss) may be created in the following manner: the controller entity 1103 may know the transmission TX power of the second communication devices 1102 in the carrier band they use as a beacon; this carrier may be the carrier TDD or FDD used in the aggregator layer, the Wi-Fi carriers used as a beacon or a second carrier used for beacon purpose. The controller entity 1103 then calculates pathloss=TX power-RX power.

In the scenario illustrated in FIG. 2B, certain second communication devices 204 are currently acting as aggregators. The controller entity here is an aggregator controller, AC, 202 and the radio access network includes two aggregator layer cells 250. The AC 202 may send an instruction to second communication devices (i.e. the aggregator enabled UEs 204) to broadcast beacon signals at one or more specific radio frequency RF bands, so that first communication devices (i.e. "normal UEs" 210) make measurements in such a way that the current configuration may be changed, due to certain conditions reported to the controller entity 202 from the respective eNodeB (which provides a macrocell 200, 280).

As illustrated in FIG. 2B, then, a number of aggregators 204 may be available in association with a specific macrocell 200 to provide a coverage area to offer service to a number of first communication devices 210 currently connecting through the network via the macrocell 200.

FIGS. 11B and 11C show a telecommunication network, at respective time instants, in which a controller entity 1103 activates certain second communication devices (1111 and 1113, in FIG. 11B; 1116 and 1118, in FIG. 11C, say) to broadcast beacon signals (1105) at one or more specific radio frequency RF bands, wherein the beacon signals (1105) enable one or more first communication devices (1112, 1113, 1114, 1116; 1118, 1119; say) to make measurements.

The controller entity 1103 receives measurements from the one or more first communication devices, said measurements based on the beacon signals (1105) received at said one or more first communication devices and, using the measurements, generates a coverage map that is indicative of the coverage that the second communication devices can provide for the first communication devices.

Figure 12:
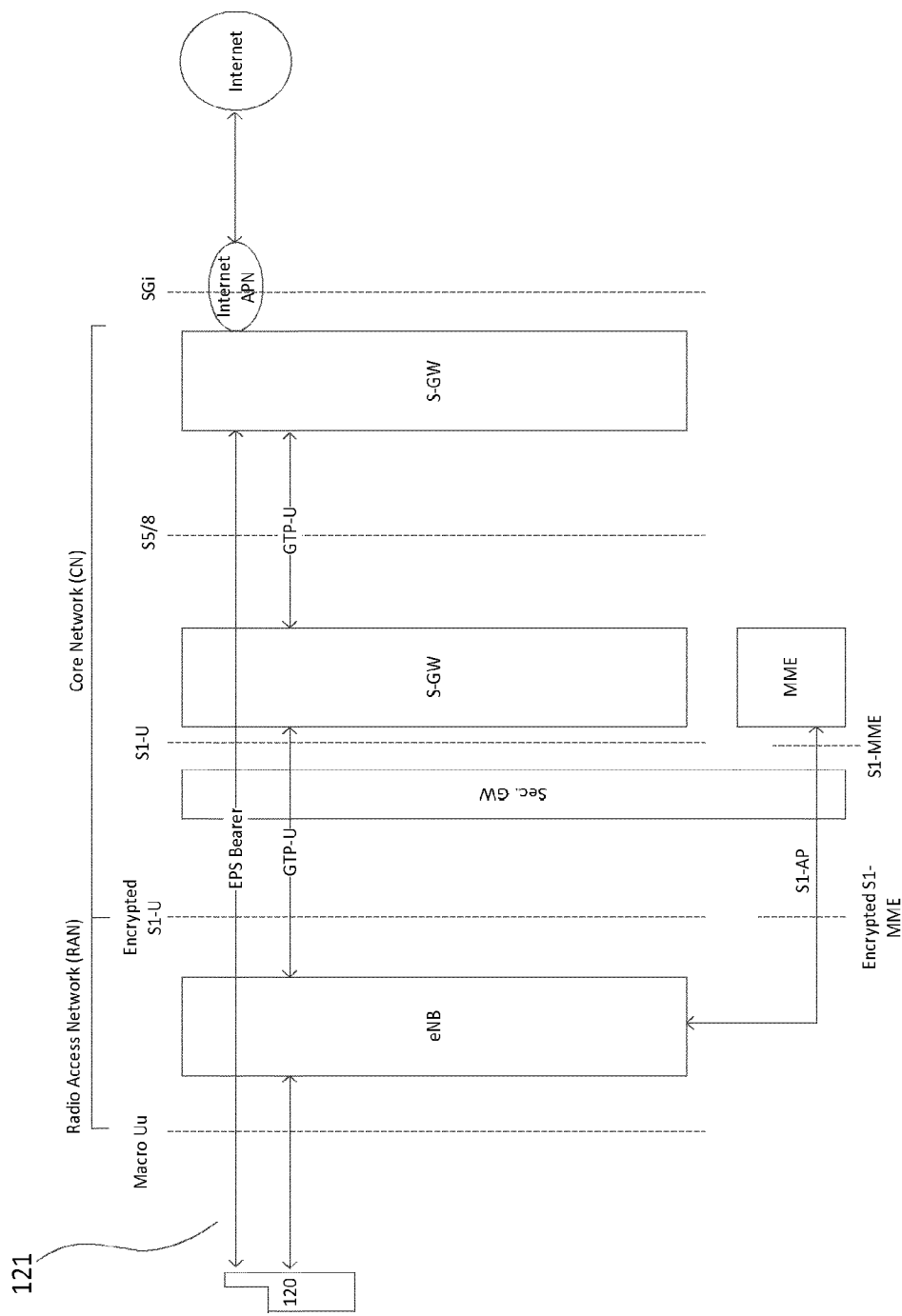
FIG. 12 is a schematic diagram of key elements of an LTE network and communication paths through that network.

FIG. 12 is a schematic diagram of selected elements of an LTE system, showing components and interfaces used in the provision of communication services.

Services are provided to a UE 120 using an EPS bearer 121 between the UE 120 and the core network. The EPS bearer 121 is provided across a number of interfaces and components, and carried using a range of protocols. The UE/eNodeB radio interface is known as the Uu interface, over which data is carried using the PDCP and lower-layer protocols. In FIG. 12 this interface is labelled "Macro Uu" to clarify that it is a radio interface of the Macro LTE RAN.

User data is carried over the EPS bearer 121 between the RAN and CN by the GTP-U protocol. At lower layers of the communication stacks data may be encrypted over certain interfaces. The S1-U interface between an eNB and Serving Gateway (S-GW) may be divided into an Encrypted S1-U interface between the eNB and a Security GateWay (Sec. GW), and an unencrypted S1-U interface between the Sec GW and the S-GW. The IPsec protocol is commonly utilised for the Encrypted S1-U interface, but in principle any appropriate security mechanism may be utilised.

The S1-AP interface connects the eNB and MME for the carriage of control plane signals. This interface may also be encrypted, and may utilise the IPsec protocol.

As set out above, UE 120 may act as an aggregator to provide cellular coverage to other UEs. In this configuration the UE's EPS bearer is utilised for backhaul of data from the other UEs. When acting as an aggregator a UE 120 is essentially performing the function of an eNodeB of the LTE RAN. The eNodeB part of the UE must thus connect to the S/P-GW and MME via S1-U and S1-AP interfaces respectively. These connections carry the user data of UEs connected to the aggregator, and control signalling for managing the eNodeB in the network. However, if those connections are carried over the EPS bearer 121 the S1 data will arrive at the SGi interface at the termination of that EPS bearer 121, but may be unable to reach the Sec. GW as that gateway is not typically accessible from the SGi or internet APN provided by that interface.

Figure 13:
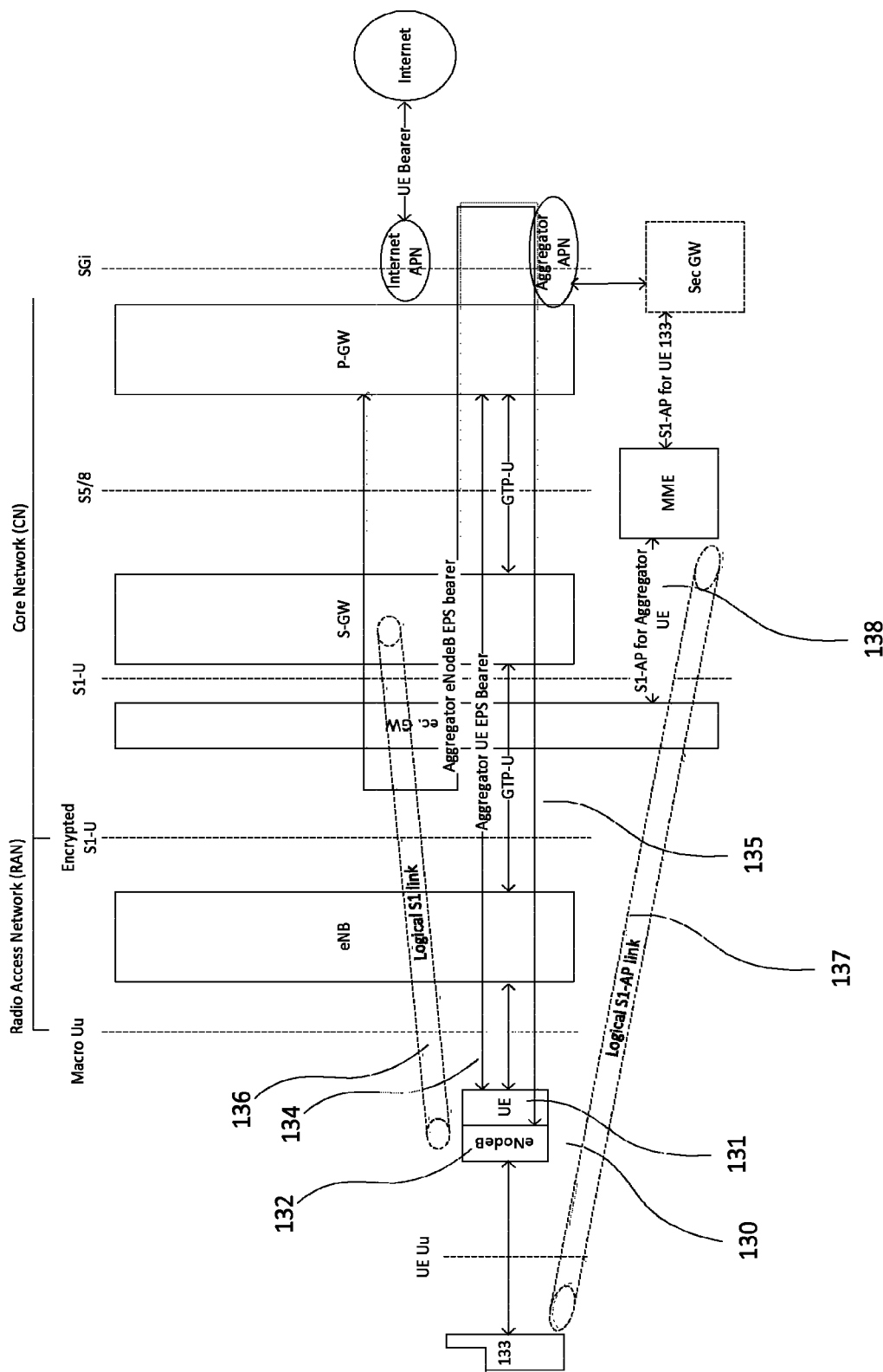
FIG. 13 is a schematic diagram of key elements of an LTE network and communication paths for use by a relay.

FIG. 13 shows a schematic diagram of selected interfaces and components utilised to enable a UE to act as a relay in an LTE network.

UE 130 functionally comprises an aggregator UE 131 and aggregator eNodeB 132. Aggregator UE 131 connects to the LTE RAN in the conventional way and can be utilised as a conventional UE. Aggregator UE 131 and aggregator eNodeB 132 may be provided by common hardware within UE 130, or by distinct, but connected, hardware. Functionality may be provided by hardware or software as appropriate. The UE 130 may be a dedicated aggregator and may not provide its own UE functionality.

Aggregator eNodeB 132 acts as an eNodeB to provide a UE Uu interface to which other UEs 133 can connect. The Aggregator eNodeB 132 utilises a bearer 134 (Aggregator UE EPS Bearer) established by the aggregator UE 131 for backhaul of the aggregator eNodeB 132 control data, and user data of UEs 133 connected to the aggregator eNodeB 132.

Subject to the description below the aggregator UE EPS Bearer 134 is established in the conventional manner. This aggregator UE EPS Bearer 134 terminates at the appropriate P-GW.

An aggregator eNodeB EPS Bearer 135 is also established, which is terminated at the aggregator eNodeB 132 and the P-GW, but after passing through a Sec GW twice (as explained in more detail below). The aggregator eNodeB EPS Bearer 135 thus provides a logical S1 link 136 from the aggregator eNodeB 132 to the Core Network (S/P gateway), and a Logical S1-AP link 137 from the UE 133 to the MME. These logical S1 links 136, 137 can be utilised in the conventional way for user data and control signalling from the aggregator eNodeB 132. The aggregator eNodeB 132 thus appears as a conventional eNodeB to the LTE core network.

The P-GW is provided with two APNs at the SGi interface—an internet APN providing access to the public internet, and an aggregator APN which provides access to the Sec GW. The aggregator APN carries the aggregator eNodeB EPS Bearer 135 such that it can traverse to the Sec GW and then the S/P-GW after the first pass through those entities where it was carried by the aggregator UE EPS Bearer 134.

Aggregator UE 131 can reach the MME using a conventional S1-AP link 138 from the Sec GW.

Use of the layer and addressing system described below allows the aggregator eNodeB to interact with the core network and for user data from UEs connected to the aggregator eNodeB to be carried securely, without requiring modification of the RAN or core network.

Figure 14:
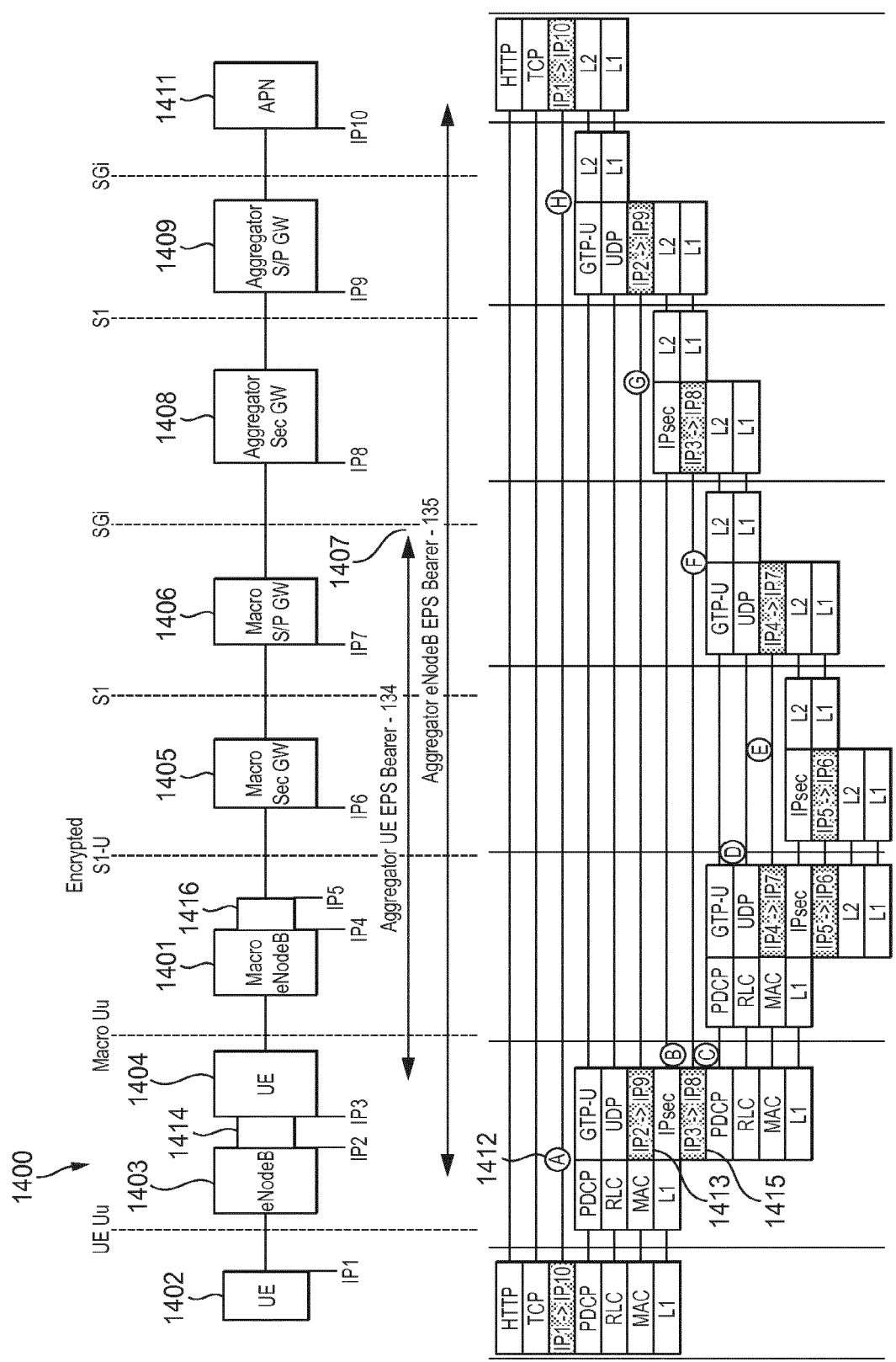
FIG. 14 shows a communication path for a UE acting as a relay, and the applicable layered communication system.
Figure 15:
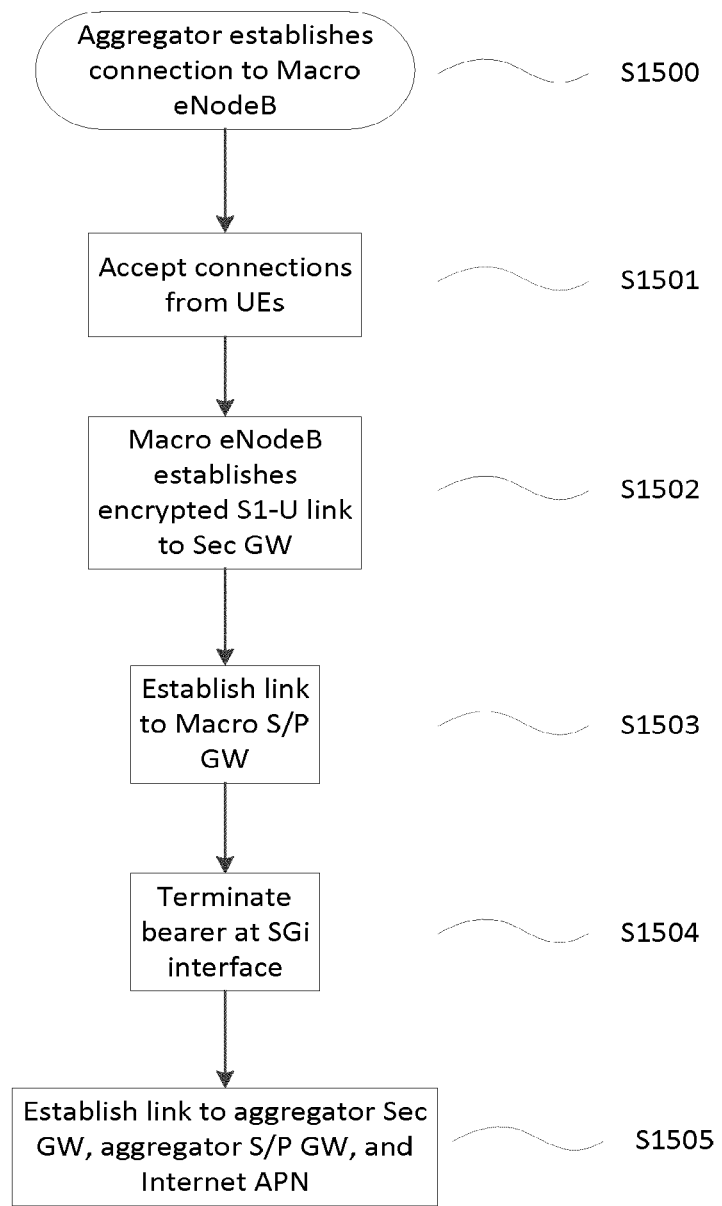
FIG. 15 shows a flow chart for communications by a UE acting as a relay.
Figure 16:
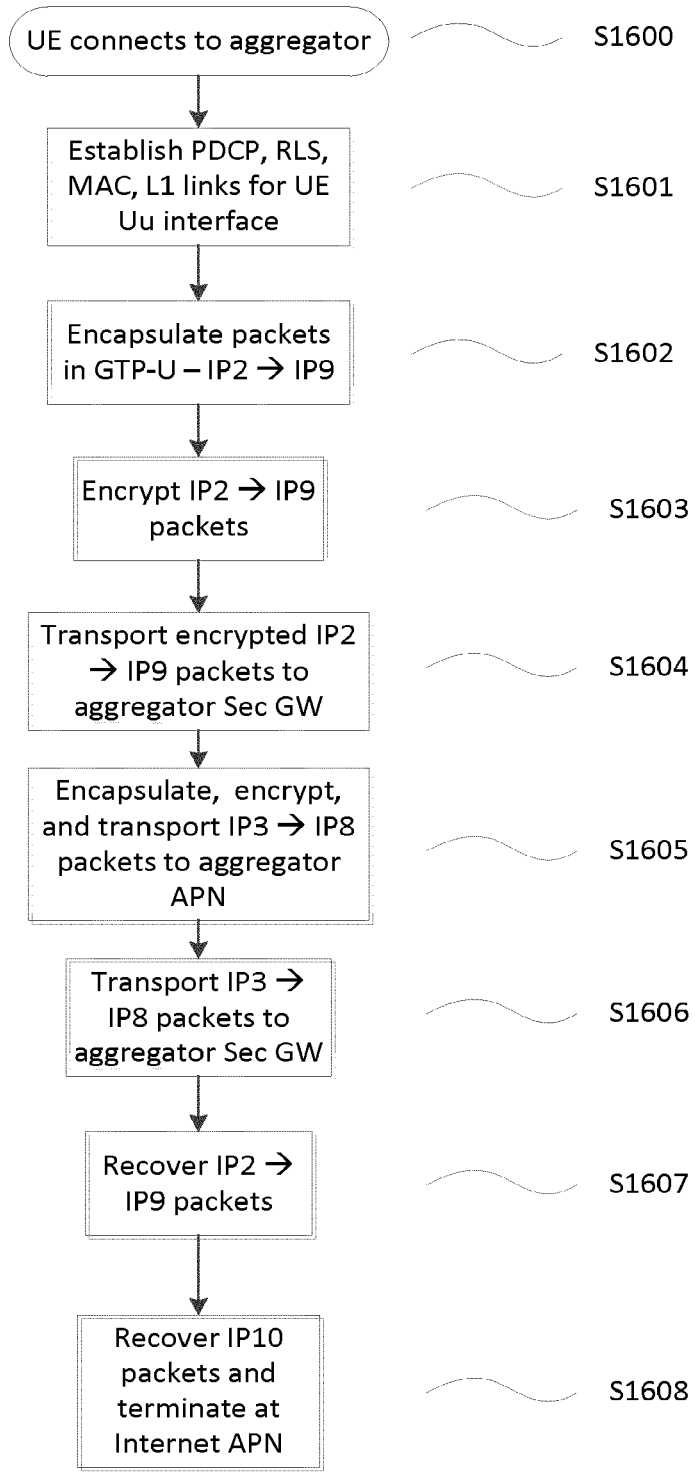
FIG. 16 shows a flow chart for communications by a UE.

FIG. 14 is a schematic diagram showing the interfaces and layer structures utilised to provide the bearers described in relation to FIG. 13. FIG. 15 and FIG. 16 show steps of methods applied in conjunction with the arrangement of FIG. 14.

Aggregator 1400 is an LTE UE configured to operate as a aggregator. At operation S1500 aggregator 1400 establishes a connection to Macro eNodeB 1401 across the Macro Uu interface, and at operation S1501 accepts connections from UEs 1402 across the UE Uu interface. Device 1400 comprises an aggregator eNodeB function 1403 and an aggregator UE function 1404.

At operation S1502 Macro eNodeB 1401 establishes an encrypted S1-U link across the S1 interface to a Security Gateway 1405. This gateway is referred to as the Macro Security Gateway as it attends to security for the Macro eNodeB 1401, as opposed to other elements of the system. This title does not indicate any special function, it is used purely for descriptive purposes.

A further link to an S/P GW 1406 at operation S1503, referred to as the Macro S/P GW for comparable reasons as Macro Sec GW, is established. These links are used to provide the aggregator UE EPS Bearer 134 for the aggregator UE part 1404 of aggregator 1400, which terminates (S1504) at SGi interface 1407 to provide internet access.

As will be apparent to the Skilled Person, the terminology "establishes a link" does not necessarily mean a circuit-switched connection is established, but rather that there exists a means to route data between the two entities that are said to be linked. Furthermore the sequence of description herein does not necessarily indicate the sequence in which the steps are actually performed.

Traffic carried on the aggregator UE EPS Bearer 134 comprises user data from UE part 1404 of relay 1400, and also S1 traffic of eNodeB part 1403 of aggregator 1400.

A further encrypted link is established at operation S1505 from Macro S/P GW 1406 to aggregator Sec GW 1408. Links to aggregator S/P Gateway 1409 and then to an internet APN 1411 across the SGi interface are also established. These links and the aggregator eNodeB Bearer discussed above combine to provide the aggregator eNodeB EPS bearer 135 to carry user traffic from UEs 1402 connected to aggregator 1400 to the internet APN.

Macro Security Gateway 1405 may be the same physical equipment as aggregator Security Gateway 1408. Similarly, Macro S/P Gateway 1406 may be the same physical equipment as aggregator S/P Gateway 1409. Mechanisms to route data through the various equipment and interfaces to provide the required bearers are described below with reference to FIGS. 14 and 16. For clarity the following description is given using transmission of data in a single direction from the UE to the Internet APN. Transmission in the opposite direction (i.e. reception by UE 1402) operates on the same principles, but with source and destination addresses reversed, as will be understood by the person skilled in the art.

At operation S1600 UE 1402 connects to aggregator eNodeB 1403 in the conventional manner across the UE Uu interface. In an example, HTTP, TCP/UDP, and IP layers at the UE communicate with corresponding layers at APN 1411, using address IP1 as the source address and IP10 as the destination address. Communication with aggregator eNodeB across the UE Uu interface utilises the conventional PDCP, RLS, MAC, and L1 layers delivering the IP packets to point 1412 (Operation S1601).

The IP packets are encapsulated from point 1412 in the GTP-U protocol and are transported to the aggregator S/P GW 1409 using IP2 as the source address and IP9 as the destination address, as shown at 1413 (Operation S1602). This is a conventional eNodeB to S/P GW link, but is established specifically between the eNodeB and aggregator S/P GW. As explained above, the aggregator S/P GW may be the same physical equipment as the Macro S/P GW 1406, but is logically distinct and has a different address (IP9) to the address of the macro S/P GW (IP7).

The IP2→IP9 packets at 1413 are encrypted by IPSec function 1414 of the aggregator 1400 (Operation S1603). The encrypted packets are transported at operation 1415/S1604 to the aggregator Security GW 1408 using the IPSec function 1414 address IP3 as source address, and Relay Security GW 1408 address IP8 as the destination.

The IP3→IP8 packets 1415 are transported across the Macro Uu interface using the conventional PDCP, RLC, MAC, and L1 protocols to Macro eNodeB 1401.

The aggregator eNodeB 1403 utilises Relay UE 1404 as a transparent resource for the transfer of its data. That is, the aggregator UE 1404 is acting as a Data Communication Equipment for the aggregator eNodeB 1403. This avoids the need to define IP subnets within the aggregator 1414 or to perform routing or address translation in that device.

The IPSec tunnel (IP3→IP8) provides a means for the cellular core network to directly address the aggregator eNodeB 1403 by its address IP3, thus making communications more straightforward and removes a need for address translation and techniques such as "routing behind the MS" in order to address the aggreagtor eNodeB 1403.

Macro eNodeB 1401 transports the IP3 4 IP8 packets to the aggregator Sec GW 1408 in the conventional manner, with the caveat that those packets pass through another Security GW and S/P GW. At operation S1605 Macro eNodeB 1401 encapsulates the IP3→IP8 packets in the GTP-U protocol, which are addressed for transport from IP4 (Macro eNodeB address) to IP7 (Macro S/P GW). Those IP4→IP7 packets are encrypted by IPSec function 1416 and addressed for transport from IP5 (Macro eNodeB IPSec 1416 address) to IP6 (Macro Sec GW 1405 address).

At Macro Sec GW 1405 IPSec eNodeB is terminated to recover IP Packets IP4→IP7 in the conventional manner. The recovered packets are transmitted to Macro S/P GW 1406 in the conventional manner, where the IP3→IP8 packets are routed (operation S1606) to the aggregator APN 1407 and hence to the aggregator Sec GW 1408 (which as discussed above may be the same physical equipment as Macro Sec GW 1405). As explained above aggregator APN 1407 is distinct from Internet APN 1411 aggregator APN 1407 can access aggregator Sec GW 1408.

At aggregator Sec GW 1408 the Relay IPSec function 1414 layer is terminated (IP3→IP8 packets) to recover the IP2→IP9 packets (Operation S1607).

The recovered IP2→IP9 packets are passed to the aggregator S/P GW 1409 (which may be the same physical equipment as the Macro S/P GW). The aggregator S/P GW 1409 operates in the conventional manner to terminate the aggregator GTP-U layer, and transports (Operation S1608) the recovered IP1→IP10 packets to the SGi interface and hence to the APN, from where they can be routed on the GiLAN to the internet.

The same principles can be utilised to route S1-AP traffic from UE 1402 and aggregator UE 1404 to the MME. S1-AP signalling for the aggregator UE 1404 can be routed to the MME from Macro Sec GW 1405 after decryption, and S1-AP signalling for the UE 1402 can be routed to the MME from aggregator Sec GW 1408 after decryption.

The arrangement described above thereby allows the backhaul of data from a UE connected to a relay device in a secure manner and without requiring modification of the RAN or core network, other than correct configuration of APNs.

Both the S1 and S1-AP traffic for an aggregator eNodeB is secured using the IPSec protocol which is the accepted standard for security on various LTE interfaces (see, for example, TS 33.210, TS 33.310, and TS 33.401).

As explained above to facilitate routing of S1 traffic from the Macro S/P GW 1406 to the aggregator Sec GW 1408 a specific aggregator APN is utilised which provides access to a separate SGi LAN with access to the aggregator Sec GW 1408. This may be implemented by associating a specific IP address space to the aggregator APN from which the aggregator UE 1404 obtains its address (IP3). This address may be allocated dynamically thereby allowed the aggregator UE to disconnect and re-connect to the RAN. The address of the aggregator eNodeB (IP2) also should be dynamically allocated. An example to implement this would be a DHCP address server associated with the aggregator Sec GW 1408.

During transit through the Macro Sec GW 1405 and Macro S/P GW 1406 packet sizes are increased as there is an additional layer of encryption from the aggregator IPSec layers. This may increase the packet sizes by at least 116 bytes for this region of the network, which must be accommodated by an appropriate Maximum Transmission Unit (MTU) configuration of these components.

A Path MTU (PMTU) discovery process may be performed between the aggregator IPSec function 1414 and the aggregator Sec GW 1408 to discover the maximum supported transmission unit size. This information can be utilised to define the MSS for UEs connecting to the aggregator eNodeB. Alternatively packet segmentation and re-assembly can be performed at the IPSec Function 1414 and aggregator Sec GW 1408 to reduce packet sizes as required. These approaches avoid the requirement for a core network to have particular parameters, thereby reducing the need specific configurations to be applied which can limit the freedom to utilise the system. This fragmentation is performed outside of the IPSec tunnels which is less processing intensive than fragmenting encrypted packets.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing description refer to LTE, it should be noted that the aggregator architecture described may equally be deployed in telecommunications networks based on other cellular telecommunication architectures, for example 2G, 3G, LTE-Advanced (3GPP Release 10 onwards), future architectures (e.g., 5G), as well as WD-CDMA and WiMAX. The aggregator architecture is agnostic to the specific type of RAN used. In other words, the aggregator controller/controller entity is adapted to work with any RAN and/or combinations of RANs. This is, for example, one of the reasons why in certain embodiments the aggregator controller/controller entity is independent of the RAN. Similar observations apply for the communication device for providing an aggregator facility.

In addition, it will be apparent to the reader that the term radio access technology (RAT) may extend to include related technologies such as conventional WiFi technologies (i.e. compliant with the IEEE 802.11 family of standards) and/or VLC technologies, where the context requires or allows this.

Furthermore, while the above description describes the aggregation layer as providing a bridge to the cellular network for communication devices that are at the edges of cells, the skilled reader will appreciate that dynamic coverage "blackspots" may arise elsewhere within radio coverage regions (for example, due to equipment malfunction, unusual usage patterns, and/or features of the natural or built environment).

The reader will furthermore appreciate that aspects of the foregoing disclosure apply equally and without loss of generality to aggregators (and candidate aggregators) that are fixed in a single location as to aggregators (and candidate aggregators) that are in an alternative mobility state: such as nomadic or mobile.

It will also be well understood by persons of ordinary skill in the art that whilst the described embodiments implement certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A user equipment (UE) device configured to extend a network coverage of a base station, to which the UE device is connected, to enable one or more edge UE devices that are located within an edge region of the base station's network coverage to be serviced by the base station via the UE device such that the UE device provides base station functionality by operating as an extending relay node for the base station in order to service the one or more edge UE devices, the UE device comprising:

a radio system configured to establish a cellular wireless connection to the base station, which is included in a cellular macro radio area network (RAN), the RAN being configured to provide a macro cell and being connected to a cellular core network, the cellular core network comprising a security gateway (SecGW) connected to a gateway, the gateway being provided with an aggregator Access Point Name (APN) providing access to an aggregator SecGW,
  wherein the radio system of the UE device is configured to connect to the base station of the cellular macro RAN to establish an Evolved Packet System (EPS) bearer using the aggregator APN, and
  wherein the EPS bearer transfers data from the UE device across the base station of the cellular macro RAN and provides a secure connection from the base station of the cellular macro RAN to the SecGW and terminates at the gateway;
a base station radio system configured to provide the base station functionality for extending the base station's network coverage to establish cellular wireless connections with the one or more edge UE devices to thereby enable an aggregator EPS bearer to be established for transferring edge UE data that is received at the UE device from the one or more edge UE devices across the EPS bearer; and
a security function configured to establish a secure connection with the cellular core network via the cellular wireless connection, the security function being configured to:
  secure the edge UE data received by the UE device from the one or more edge UE devices in the aggregator EPS bearer; and
  route the secured edge UE data to the aggregator SecGW for further transport in the aggregator EPS bearer, to be terminated at the or another gateway provided with an internet APN for routing unencrypted data received in the aggregator EPS bearer to a packet data network (PDN).

2. The UE device of claim 1, wherein the radio system and the base station radio system operate according to a same cellular standard.

3. The UE device of claim 2, wherein the cellular standard is LTE.

4. The UE device of claim 1, wherein the secure connection is utilized to carry S1 communication links between the base station radio system and the cellular core network.

5. A communications network for providing cellular communications to mobile devices, the network comprising:
  a cellular macro radio area network (RAN) comprising a base station configured to provide a macro cell;
  a cellular core network connected to the cellular macro RAN and comprising:
    a security gateway (SecGW) connected to a gateway, the gateway being provided with an aggregator Access Point Name (APN) providing access to an aggregator SecGW; and
  a user equipment (UE) device configured to extend a network coverage of the base station, to which the UE device is connected, to enable one or more edge UE devices that are located within an edge region of the base station's network coverage to be serviced by the base station via the UE device such that the UE device provides base station functionality by operating as an extending relay node for the base station in order to service the one or more edge UE devices, the UE device comprising:
    a radio system configured to establish a cellular wireless connection to the base station, which is included in the cellular macro RAN to establish an Evolved Packet System (EPS) bearer using the aggregator APN, wherein the EPS bearer transfers data from the UE device across the base station of the cellular macro RAN and provides a secure connection from the base station of the cellular macro RAN to the SecGW and terminates at the gateway;
    a base station radio system configured to provide the base station functionality for extending the base station's network coverage to establish cellular wireless connections with the one or more edge UE devices to thereby enable an aggregator EPS bearer to be established for transferring edge UE data that is received at the UE device from the one or more edge UE devices across the EPS bearer;
    a security function having a secure connection with the cellular core network via the cellular wireless connection, the security function being configured to:
      secure the edge UE data received by the UE device from the one or more edge UE devices in the aggregator EPS bearer; and
      route the secured edge UE data to the aggregator SecGW for further transport in the aggregator EPS bearer;
    wherein the gateway is configured such that, in use, the secured edge UE data received in the aggregator EPS bearer on termination of the EPS bearer is routed to the aggregator SecGW for it to be further carried by the aggregator EPS bearer to be terminated at the or another gateway provided with an internet APN for routing unencrypted data received in the aggregator EPS bearer to a packet data network (PDN).

6. A communication network according to claim 5, wherein the security function utilizes the IPSec security protocol.

7. A method of communication between a user equipment (UE) device and a cellular core network, the UE device being configured to extend a network coverage of a base station, to which the UE device is connected, to enable one or more edge UE devices that are located within an edge region of the base station's network coverage to be serviced by the base station via the UE device such that the UE device provides base station functionality by operating as an extending relay node for the base station in order to service the one or more edge UE devices, the method comprising:
  establishing a cellular wireless connection from a radio system of the UE device to the base station, which is included in a macro cellular radio area network (RAN), the macro cellular RAN being configured to provide a macro cell and being connected to a cellular core network, the cellular core network comprising a security gateway (SecGW) connected to a gateway, the gateway being provided with an aggregator Access Point Name (APN) providing access to an aggregator SecGW,
    wherein the radio system of the UE device connects to the base station of the macro cellular RAN to establish an Evolved Packet System (EPS) bearer using the aggregator APN, and
    wherein the EPS bearer transfers data from the UE device across the base station of the macro cellular RAN and provides a secure connection from the base station of the macro cellular RAN to the SecGW and terminates at the gateway;

establishing cellular wireless connections from a base station radio subsystem of the UE device with the one or more edge UE devices to thereby enable an aggregator EPS bearer to be established for transferring edge UE data that is received at the UE device from the one or more edge UE devices across the EPS bearer; and establishing a secure connection between a security function of the UE device and the cellular core network via the cellular wireless connection, wherein the secure connection:

secures the edge UE data received by the UE device from the one or more edge UE devices in the aggregator EPS bearer; and routes the secured edge UE data to the aggregator SecGW for further transport in the aggregator EPS bearer, to be terminated at the or another gateway provided with an internet APN for routing unencrypted data received in the aggregator EPS bearer to a packet data network (PDN).

8. A method according to claim 7, wherein the secure connection from the base station of the macro cellular RAN to the cellular core network is established using an IPSec protocol.

9. A method according to claim 7, wherein the secure connection is utilized to carry S1 communication links between the base station radio subsystem of the UE device and the cellular core network.

10. A method according to claim 7, wherein the secure connection enables direct addressing of the base station radio subsystem of the UE device from the cellular core network.

11. A method of communication in a communications network for providing cellular communications to mobile devices, the network comprising:

a cellular macro radio area network (RAN) comprising a base station configured to provide a macro cell;

a cellular core network connected to the cellular macro RAN and comprising a security gateway (SecGW) connected to a gateway, the gateway being provided with an aggregator Access Point Name (APN) providing access to an aggregator SecGW; and a user equipment (UE) device comprising a radio system and a base station radio subsystem, the UE device being configured to extend a network coverage of the base station, to which the UE device is connected, to enable one or more edge UE devices that are located within an edge region of the base station's network coverage to be serviced by the base station via the UE device such that the UE device provides base station functionality by operating as an extending relay node for the base station in order to service the one or more edge UE devices;

the method comprising:

establishing a cellular wireless connection from the radio system of the UE device to the base station to establish an Evolved Packet System (EPS) bearer using the aggregator APN, wherein the EPS bearer transfers data from the UE device across the base station and provides a secure connection from the base station to the SecGW and terminates at the gateway;

establishing cellular wireless connections from the base station radio subsystem of the UE device to the one or more edge UE devices to thereby enable an aggregator EPS bearer to be established for transferring edge UE data that is received at the UE device from the one or more edge UE devices across the EPS bearer;

establishing a secure connection between a security function of the UE device and the cellular core network via the cellular wireless connection to the cellular macro RAN;

securing, by the secure connection, the edge UE data received by the UE device from the one or more edge UE devices in the aggregator EPS bearer;

carrying, by the secure connection, the secured edge UE data from the UE device to the aggregator SecGW;

transporting unencrypted data in the aggregator EPS bearer from the aggregator SecGW to termination at the or another gateway provided with an internet APN; and routing, at the or another gateway using the internet APN, the unencrypted data received in the aggregator EPS bearer to a packet data network (PDN).

* * * * *